(12) United States Patent
Hirano et al.

(10) Patent No.: US 9,340,640 B2
(45) Date of Patent: May 17, 2016

(54) POLYOL FOR POLYURETHANE PREPARATION AND POLYURETHANE PREPARATION METHOD USING SAME

(75) Inventors: Tomohisa Hirano, Kyoto (JP); Koji Kabu, Kyoto (JP); Izumi Arai, Kyoto (JP)

(73) Assignee: SANYO CHEMICAL INDUSTRIES, LTD., Kyoto-shi (JP)

( * ) Notice: Subject to any disclaimer, the term of this patent is extended or adjusted under 35 U.S.C. 154(b) by 76 days.

(21) Appl. No.: 13/639,407

(22) PCT Filed: Apr. 21, 2011

(86) PCT No.: PCT/JP2011/002331
§ 371 (c)(1),
(2), (4) Date: Oct. 4, 2012

(87) PCT Pub. No.: WO2011/132424
PCT Pub. Date: Oct. 27, 2011

(65) Prior Publication Data
US 2013/0030140 A1    Jan. 31, 2013

(30) Foreign Application Priority Data
Apr. 22, 2010 (JP) ................................. 2010-099193

(51) Int. Cl.
*C08G 18/00* (2006.01)
*C08G 18/48* (2006.01)
(Continued)

(52) U.S. Cl.
CPC ........ *C08G 18/4804* (2013.01); *C08G 18/4018* (2013.01); *C08G 18/4072* (2013.01);
(Continued)

(58) Field of Classification Search
CPC ........... C08G 18/4845; C08G 18/4252; C08G 18/4211; C08G 18/4804; C08G 18/6674; C08G 18/4018; C08G 18/632
USPC .......... 568/618, 619, 620, 625; 521/155, 174, 521/176
See application file for complete search history.

(56) References Cited

U.S. PATENT DOCUMENTS

| | | | | |
|---|---|---|---|---|
| 4,336,341 A | * | 6/1982 | Fujiwara ............ | C08G 18/0819 521/109.1 |
| 5,145,883 A | * | 9/1992 | Saito .................. | C08G 18/4252 428/317.9 |

(Continued)

FOREIGN PATENT DOCUMENTS

| | | | | | |
|---|---|---|---|---|---|
| JP | 58083020 | A | * | 5/1983 | ............. C08G 18/50 |
| JP | 07267911 | A | * | 10/1995 | ............. C07C 233/69 |

(Continued)

OTHER PUBLICATIONS

English Translation of Document N.*

(Continued)

*Primary Examiner* — Michael L Leonard
(74) *Attorney, Agent, or Firm* — Westerman, Hattori, Daniels & Adrian, LLP

(57) ABSTRACT

A polyol (PL) for polyurethane preparation is disclosed that includes the polyol (a) and the strength-enhancing agent (b), as follows. Polyol (a): a polyoxyalkylene polyol that is the alkylene oxide adduct of an active hydrogen-containing compound (H), in which at least 40% of a hydroxyl group positioned on the terminal is a primary hydroxyl group-containing group represented by general formula (I). In general formula (I), $R^1$ represents a hydrogen atom or an alkyl group having 1 to 12 carbon atoms, cycloalkyl group, or phenyl group. Strength-enhancing agent (b): a compound that is at least one compound selected from the group comprising an ester compound, a thioester compound, a phosphoric acid ester compound, and an amide compound, and that is derived from an aromatic polyvalent carboxylic acid with a valence of 2 or higher.

2 Claims, 3 Drawing Sheets

(51) Int. Cl.
*C08G 18/42* (2006.01)
*C08G 18/40* (2006.01)
*C08G 18/63* (2006.01)
*C08G 18/66* (2006.01)
*C08G 101/00* (2006.01)

(52) U.S. Cl.
CPC ........ C08G18/4211 (2013.01); C08G 18/4252 (2013.01); C08G 18/4845 (2013.01); C08G 18/632 (2013.01); C08G 18/6674 (2013.01); *C08G 2101/005* (2013.01); *C08G 2101/0008* (2013.01); *C08G 2101/0083* (2013.01)

(56) References Cited

U.S. PATENT DOCUMENTS 5,614,605 A * 3/1997 Mafoti et al. .................. 528/44
6,531,566 B1 * 3/2003 Satake .......................... 528/76
2012/0277338 A1 * 11/2012 Kaplan et al. ................. 521/157

FOREIGN PATENT DOCUMENTS

JP 07278249 A * 10/1995 ............. C08G 18/32
JP 10251367 A * 9/1998 ............. C08G 18/32

OTHER PUBLICATIONS

English Translation of Document O.*
English Translation of Document P.*

* cited by examiner

POLYOL FOR POLYURETHANE PREPARATION AND POLYURETHANE PREPARATION METHOD USING SAME

TECHNICAL FIELD

The present invention relates to a polyol that is suitable as a raw material for polyurethanes such as a polyurethane foam and a polyurethane elastomer and that imparts superior mechanical properties to a polyurethane.

BACKGROUND ART

There has been known such a specific polyol that the average number of moles of ethylene oxide added per active hydrogen and the primary hydroxidation ratio of terminal hydroxyl groups satisfy a specific relation. It is known that in producing a urethane foam, a soft polyurethane foam with superior vibration characteristics can be produced by making a polyol component contain this specific polyol (Patent Document 1).

On the other hand, cost reduction has been strongly demanded in recent years, and a lower density soft polyurethane foam has been desired for weight reduction. For example, in application to vehicles, reduction in the density of a soft polyurethane foam has also been required for weight reduction in order to cope with fuel efficiency requirements.

As a countermeasure to such demands for density reduction, the amount of water used as a foaming agent is liable to further increase. Increase in the amount of water used (Non-Patent Document 1, etc.) leads to increase in the amount of carbon dioxide gas generated in foam production and is thus effective for density reduction of a soft polyurethane foam. However, if the density of a foam decreases, foam hardness also decreases. Specific techniques for increasing the hardness of a soft polyurethane foam include, for example, a method involving increasing the amount of a crosslinking agent used (Non-Patent Document 1). However, such a method still has problems such as insufficient mechanical properties, such as elongation and tensile strength, of a soft polyurethane foam, and therefore a soft polyurethane foam with improved hardness and maintained mechanical properties has been demanded.

PRIOR ART DOCUMENTS

Patent Documents

Patent Document 1: JP-A-2005-290202

Non-Patent Document

Non-Patent Document 1: Keiji Iwata, "Polyurethane Resin Handbook", The Nikkan Kogyo Shimbun, Ltd., published on May 20, 1987, 1st Edition, page 32

SUMMARY OF THE INVENTION

Problems to be Solved by the Invention

However, urethane elastomers and polyurethane foams produced using the above-mentioned conventional polyols have problems that mechanical properties and moisture resistance are insufficient.

An object of the present invention is to provide a polyol with which such problems have been solved.

Solutions to the Problems

That is, the gist of the polyol (PL) for polyurethane preparation of the present invention is to contain the following polyol (a) and the following strength-enhancing agent (b):

polyol (a): a polyoxyalkylene polyol that is an alkylene oxide adduct of an active hydrogen-containing compound (H) and in which at least 40% of the hydroxyl groups positioned on the terminal are primary hydroxyl group-containing groups represented by the following general formula (I):

[Chem. 1]

[in general formula (I), $R^1$ represents a hydrogen atom or an alkyl group having 1 to 12 carbon atoms, cycloalkyl group, or phenyl group, wherein the alkyl group having 1 to 12 carbon atoms, cycloalkyl group, or phenyl group may have been substituted with a halogen atom or an aryl group], strength-enhancing agent (b): a compound that is at least one compound selected from the group consisting of an ester compound, a thioester compound, a phosphoric acid ester compound, and an amide compound, and that is derived from an aromatic polyvalent carboxylic acid with a valence of 2 or higher.

The gist of the method for preparing a polyurethane of the present invention is a method of preparing a polyurethane by reacting a polyol component with an isocyanate component, wherein the polyol component contains the above-mentioned polyol (PL) in an amount of 10 to 100% by weight based on the weight of the polyol component.

Effects of the Invention

A polyurethane obtained by using the polyol (PL) for polyurethane preparation of the present invention has the following effect.

(1) Mechanical properties of a polyurethane are improved, for example, a polyurethane foam prepared using the polyol (PL) for polyurethane preparation has satisfactory hardness.

MODE FOR CARRYING OUT THE INVENTION

Figure 1:
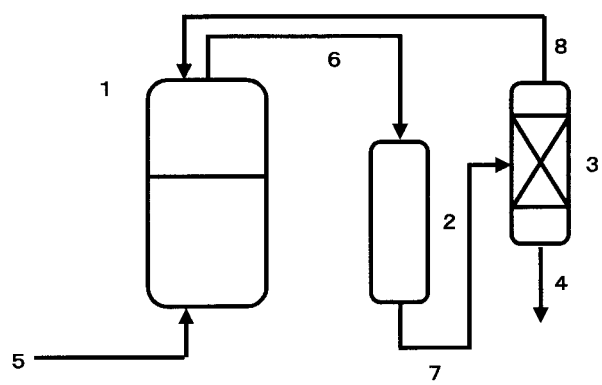
FIG. 1 is a diagram illustrating the reaction apparatus of Production Example 1.

The polyol (PL) for polyurethane preparation in the present invention is a polyol comprising the following polyol (a) and the following strength-enhancing agent (b):

polyol (a): a polyoxyalkylene polyol that is an alkylene oxide adduct of an active hydrogen-containing compound (H) and in which at least 40% of the hydroxyl groups positioned on the terminal are primary hydroxyl group-containing groups represented by the following general formula (I):

[in general formula (I), $R^1$ represents a hydrogen atom or an alkyl group having 1 to 12 carbon atoms, cycloalkyl group, or phenyl group, wherein the alkyl group having 1 to 12 carbon atoms, cycloalkyl group, or phenyl group may have been substituted with a halogen atom or an aryl group], strength-enhancing agent (b): a compound that is at least one compound selected from the group consisting of an ester compound, a thioester compound, a phosphoric acid ester compound, and an amide compound, and that is derived from an aromatic polyvalent carboxylic acid with a valence of 2 or higher.

The polyol (a) is an alkylene oxide adduct of an active hydrogen-containing compound (H).

Examples of the active hydrogen-containing compound (H) include a hydroxyl group-containing compound, an amino group-containing compound, a thiol group-containing compound, a phosphoric acid compound, and a mixture of two or more kinds of these.

Examples of (H) also include a compound having two or more kinds of the above-mentioned active hydrogen-containing functional groups in the molecule.

Examples of the hydroxyl group-containing compound include water, di- to octahydric polyhydric alcohols, polyhydric phenols, and the like. Specific examples include dihydric alcohols, such as ethylene glycol, propylene glycol, 1,4-butanediol, 1,6-hexanediol, diethylene glycol, neopentyl glycol, 1,4-bis(hydroxymethyl)cyclohexane, and 1,4-bis(hydroxyethyl)benzene; trihydric alcohols, such as glycerol and trimethylolpropane; tetra- to octahydric alcohols, such as pentaerythritol, sorbitol, and sucrose; polyhydric phenols, such as pyrogallol, catechol, and hydroquinone; bisphenols, such as bisphenol A, bisphenol F, and bisphenol S; polybutadiene polyols; castor oil-based polyols; polyfunctional (e.g., the number of functional groups is 2 to 100) polyols, such as (co)polymers of hydroxyalkyl(meth)acrylates, and polyvinyl alcohol; and the like.

(Meth)acrylate means methacrylate and/or acrylate, and the same shall apply hereinafter.

Examples of the amino group-containing compound include amines, polyamines, aminoalcohols, and the like. Specific examples include ammonia; monoamines, such as alkylamines having 1 to 20 carbon atoms (hereinafter abbreviated as C) (e.g., butylamine) and aniline; aliphatic polyamines, such as ethylenediamine, hexamethylenediamine, and diethylenetriamine; heterocyclic polyamines, such as piperazine and N-aminoethylpiperazine; alicyclic polyamines, such as dicyclohexylmethanediamine and isophoronediamine; aromatic polyamines, such as phenylenediamine, tolylenediamine, and diphenylmethanediamine; alkanolamines, such as monoethanolamine, diethanolamine, and triethanolamine; polyamidepolyamines obtained by condensation of a dicarboxylic acid with an excess of polyamine; polyetherpolyamines: hydrazines (e.g., hydrazine and monoalkylhydrazine), dihydrazides (e.g., succinic acid dihydrazide and terephthalic acid dihydrazide), and guanidines (e.g., butylguanidine and 1-cyanoguanidine); and dicyandiamides, and the like; and a mixture of two or more kinds of these.

Examples of the thiol group-containing compound include polythiol compounds, examples of which include di- to octavalent polythiols. Specific examples include ethylene dithiol, 1,6-hexanedithiol, and the like.

Examples of the phosphoric acid compound include phosphoric acid, phosphorous acid, phosphoric acid, and the like.

Among these active hydrogen-containing compounds (H), hydroxyl group-containing compounds and amino group-containing compounds are preferred from the viewpoint of reactivity, and water, alcohols, and amines are particularly preferred.

Examples of the alkylene oxide (hereinafter abbreviated as AO) to be add to the active hydrogen-containing compound (H) include $C_{2-6}$ AOs, such as ethylene oxide (hereinafter abbreviated as EO), 1,2-propylene oxide (hereinafter abbreviated as PO), 1,3-propylene oxide, 1,2 butylene oxide, 1,4-butylene oxide, and the like. Among these, PO, EO, and 1,2-butylene oxide are preferred from the viewpoints of properties and reactivity. In the case where two or more kinds of AOs are used (e.g., PO and EO), the method of addition may be either block addition or random addition, and a combination thereof is also applicable.

As an alkylene oxide adduct of the active hydrogen-containing compound (H), a polyoxyalkylene polyol represented by the following general formula (II) is included.

[Chem. 3]

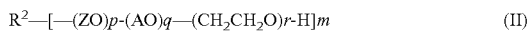

$$R^2-[-(ZO)p\text{-}(AO)q-(CH_2CH_2O)r\text{-}H]m \quad (II)$$

In general formula (II), $R^2$ is an m-valent group resulting from the removal of m active hydrogen atoms from the active hydrogen-containing compound (H), and m is the number of active hydrogen atoms which (H) has and is a numeral of 2 to 100.

From the viewpoint of the properties, such as viscosity, of (a), m is preferably 50 or less and more preferably 10 or less.

In the above general formula (II), Z is a $C_{2-12}$ alkylene group or cycloalkylene group represented by the following general formula (III) or (IV). The $C_{2-12}$ alkylene or cycloalkylene group may have been substituted with a halogen atom or an aryl group.

[Chem. 4]

[Chem. 5]

In general formulae (III) and (IV), $R^3$ represents a hydrogen atom or a $C_{1-10}$ alkyl group, cycloalkyl group, or phenyl group. The $C_{1-10}$ alkyl group, cycloalkyl group, or phenyl group may have been substituted with a halogen atom or an aryl group.

Specific examples of Z include an ethylene group, a propylene group, a butylene group, a chloropropylene group, a phenylethylene group, a 1,2-cyclohexylene group, and the like, and a combination of two or more kinds of these; among these, a propylene group, a butylene group, and an ethylene group are preferred from the viewpoint of the properties, such as viscosity, of (a). In taking into consideration the acquisition of the hydrophobicity of (a), the use of a propylene group, a butylene group, or the like or a combination of an ethylene group and another alkylene group is advantageous.

In the above general formula (II), A is a $C_{3-12}$ alkylene group or cycloalkylene group represented by the following general formula (V) or (VI). The $C_{3-12}$ alkylene group or cycloalkylene group may have been substituted with a halogen atom or an aryl group.

[Chem. 6]

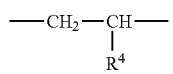

(V)

[Chem. 7]

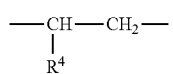

(VI)

In general formulae (V) and (VI), $R^4$ represents a $C_{1-10}$ alkyl group, cycloalkyl group, or phenyl group. The $C_{1-10}$ alkyl group, cycloalkyl group, or phenyl group may have been substituted with a halogen atom or an aryl group.

Specific examples of A include a propylene group, a butylene group, a chloropropylene group, a phenylethylene group, a 1,2-cyclohexylene group, and a combination of two or more kinds of these. Among these, a propylene group and a butylene group are preferred from the viewpoint of the properties, such as viscosity, of (a).

When there are a plurality of Z's or A's, these may be the same or different.

In general formula (II), p and r are integers of 0 to 200. q is an integer of 1 to 200.

From the viewpoint of the viscosity of the polyol (a), p+q+r is preferably an integer of 1 to 400, more preferably 1 to 200.

Of the ones represented by general formula (II), one in which r is 0 indicates that no EO has been added to the terminals of the polyol (a).

In the one represented by general formula (II), of the moieties of $(AO)_q$ in general formula (II), preferably at least 40%, more preferably at least 60%, even more preferably at least 65% of the structures A positioned on the terminal are structures represented by general formula (VI). When within this range, the moisture resistance of a soft urethane foam becomes good.

In the polyol (a), at least 40% of the hydroxyl groups positioned on the terminal are primary hydroxyl group-containing groups represented by the above general formula (I).

For example, when (a) is represented by the above general formula (II), although possible hydroxyl group-containing groups positioned on the terminal include two kinds, i.e., a primary hydroxyl group-containing group represented by the above general formula (I) and a secondary hydroxyl group-containing group represented by the following general formula (X) that is found when r=0, at least 40% of the hydroxyl groups positioned on the terminal are primary hydroxyl group-containing groups represented by the above general formula (I) in (a) regardless of the value of r in the above general formula (II).

In (a), the proportion accounted for by the primary hydroxyl group-containing groups represented by the above general formula (I) relative to all the terminal hydroxyl groups of (a) (this is defined herein as a primary hydroxyl group ratio; the same shall apply hereinafter) is at least 40% based on the quantity of all the terminal hydroxyl groups of the polyol (a), and from the viewpoint of the reactivity of (a), it is preferably at least 60%, more preferably at least 65%. When the primary hydroxyl group ratio is less than 40%, the reactivity as a polyol component is insufficient.

[Chem. 8]

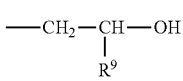

(X)

$R^1$ in the above general formula (I) represents a hydrogen atom or a $C_{1-12}$ alkyl group, cycloalkyl group, or phenyl group. The $C_{1-12}$ alkyl group, cycloalkyl group, or phenyl group may have been substituted with a halogen atom or an aryl group. In general formula (X), $R^9$ represents a $C_{1-12}$ alkyl group, cycloalkyl group, or phenyl group. The $C_{1-12}$ alkyl group, cycloalkyl group, or phenyl group may have been substituted with a halogen atom or an aryl group.

Specific examples of $R^1$ include a hydrogen atom; linear alkyl groups, such as a methyl group, an ethyl group, and a propyl group; branched alkyl groups, such as an isopropyl group; a phenyl group and substituted phenyl groups, such as a p-methylphenyl group; substituted alkyl groups, such as a chloromethyl group, a bromomethyl group, a chloroethyl group, and a bromoethyl group; substituted phenyl groups, such as a p-chlorophenyl group and a p-bromophenyl group; cyclic alkyl groups, such as a cyclohexyl group; and a combination of two or more kinds of these. Specific examples of $R^9$ include the groups provided as examples of $R^1$ except for a hydrogen atom.

In the present invention, the primary hydroxyl group ratio is calculated by subjecting a sample to esterification pretreatment beforehand and then performing measurement by a $^1$H-NMR method.

The method of measuring the primary hydroxyl group ratio is explained concretely below.

<Sample Preparation Method>

About 30 mg of a sample to be measured is weighed in a sample tube of 5 mm in diameter for NMR and then is dissolved by the addition of about 0.5 ml of a deuteration solvent. Then, about 0.1 ml of trifluoroacetic anhydride is added, whereby a sample for analysis is obtained. Examples of the deuteration solvent include deuterated chloroform, deuterated toluene, deuterated dimethyl sulfoxide, deuterated dimethylformamide, and the like, and a solvent capable of dissolving the sample is selected appropriately.

<NMR Measurement>

$^1$H-NMR measurement is performed under ordinary conditions.

<Calculation Method of Primary Hydroxyl Group Ratio>

By the method of pretreatment described above, terminal hydroxyl groups of a polyoxyalkylene polyol react with added trifluoroacetic anhydride to form a trifluoroacetic acid ester. As a result, signals originated in a methylene group to which a primary hydroxyl group is bonded are observed near 4.3 ppm, and signals originated in a methine group to which a secondary hydroxyl group is bonded are observed near 5.2 ppm (deuterated chloroform is used as a solvent). The primary hydroxyl group ratio is calculated from the following formula.

Primary hydroxyl group ratio (%)=[$a/(a+2\times b)$]×100

In the formula, a is an integral value of the signal near 4.3 ppm originated in a methylene group to which a primary hydroxyl group is bonded; and b is an integral value of the signal near 5.2 ppm originated in a methine group to which a secondary hydroxyl group is bonded.

From the viewpoint of the mechanical properties of a polyurethane, the polyol (a) preferably satisfies mathematical expression (1):

$$y \leq 28.3 \times x^{-2} \times (100-z)/100 \qquad (1)$$

[in mathematical expression (1), x represents a hydroxyl value expressed in the unit of mgKOH/g, y represents a total degree of unsaturation expressed in the unit of meq/g, and z is an ethylene oxide content based on the weight of (a) and is 0 to 50% by weight].

In the above mathematical expression (1), the range of x is preferably 5 to 280 mgKOH/g, more preferably 10 to 115 mgKOH/g, and even more preferably 25 to 75 mgKOH/g. If x is 5 mgKOH/g or more, it is easy to handle the polyoxyalkylene polyol because its viscosity of is low, and if x is 280 mgKOH/g or less, the elongation property of the polyurethane synthesized is good. x is determined in accordance with JIS K-1557.

y is the total degree of unsaturation (meq/g) of the polyol (a) and is determined in accordance with JIS K-1557.

From the viewpoint of the mechanical properties of a polyurethane, the range of y is preferably 0 to 0.04, more preferably 0 to 0.03, and even more preferably 0 to 0.02.

z is the ethylene oxide content (% by weight) of the polyol (a) based on the weight thereof. The range of z is preferably 0 to 50, more preferably 0 to 25, and particularly preferably 0 to 20. If z exceeds 50, polyurethane moisture resistance becomes poor.

In mathematical expression (1), the hydroxyl value x can be expressed by a hydroxyl equivalent w, and in such a case, the hydroxyl equivalent w, the total degree of unsaturation y, and the ethylene oxide content z satisfy the relation of mathematical expression (2). The hydroxyl equivalent w is a value obtained by dividing the number average molecular weight of the polyol (a) by the number average hydroxyl group number of (a).

$$y \leq (9.0 \times 10^{-9}) w^2 \times (100-z)/100 \qquad (2)$$

As described above, the relation between the hydroxyl value x, the total degree of unsaturation y, and the ethylene oxide content z of the polyol (a) preferably satisfies the relation of mathematical expression (1).

$$y \leq 28.3 \times x^{-2} \leq (100-z)/100 \qquad (1)$$

The polyol (a) is characterized by its possession of sufficiently high reactivity with isocyanates and hydrophobicity. Polyurethanes obtained using this (a) become good in polyurethane mechanical properties (hardness, breaking elongation, tensile strength, tear strength) and moisture resistance because the polyol is highly reactive during polyurethane preparation.

More preferably, the polyol (a) satisfies the relation of mathematical expression (3).

$$y \leq 18.9 \times x^{-2} \times (100-z)/100 \qquad (3)$$

A polyol (a) that satisfies mathematical expression (3) has been reduced in the amount of unsaturated monool as compared with the case where mathematical expression (1) is satisfied, and a polyurethane prepared using such a polyol (a) has further improved mechanical properties.

In the above expression, the right-hand side is a value calculated from a hydroxyl value x and an ethylene oxide content z. The right-hand side decreases as the hydroxyl value x becomes larger, in other words, the right-hand side decreases as the molecular weight per hydroxyl group of (a) becomes smaller. The right-hand side becomes smaller as the ethylene oxide content z becomes larger.

The left-hand side of each of the expressions (1) and (3) is a total degree of unsaturation y.

Incidentally, since an unsaturated group of a polyoxyalkylene polyol is formed when an alkylene oxide (especially, propylene oxide) other than ethylene oxide undergoes rearrangement reaction during the production process, the degree of unsaturation y tends to increase as the content of ethylene oxide in a polyoxyalkylene polyol decreases and the degree of unsaturation y tends to increase as the molecular weight increases. Therefore, there is a tendency that a polyoxyalkylene polyol with a low ethylene oxide content or a high molecular weight is difficult to satisfy expressions (1) and (3).

In other words, expression (1) or (3) indicates a region where the total degree of unsaturation y is smaller than the hydroxyl value x and the ethylene oxide content z. The expressions (1) and (3) indicate an experimentally found range where the effect of the present invention is achieved.

The number average molecular weight of the polyol (a) is selected appropriately according to the intended application of the polyol (PL) for polyurethane preparation, e.g., required properties of thermosetting resins such as a polyurethane to be prepared and is not particularly limited. From the viewpoint of the mechanical properties of a polyurethane, it is preferably 400 to 100,000, more preferably 400 to 20,000.

Specific examples of the polyol (a) include EO adducts of water, PO adducts of water, EO adducts of glycerol, PO adducts of glycerol, EO-PO copolymer adducts of water, PO-butylene oxide copolymer adducts of water, EO-PO copolymer adducts of glycerol, EO-PO-butylene oxide copolymer adducts of water, EO-PO-butylene oxide copolymer adducts of glycerol, and the like.

An active hydrogen-containing compound (J) represented by the following general formula (XI) can be produced by generally known methods. For example, it can be produced by ring-opening addition polymerizing a $C_{2-12}$ alkylene oxide to an active hydrogen-containing compound (H), and the catalyst for this polymerization is not particularly limited.

The polyol (a) can be obtained by ring-opening addition polymerizing a $C_{3-12}$ alkylene oxide to (J) in the presence of a catalyst (C) to form an active hydrogen compound (K) represented by the following general formula (XII). Moreover, if necessary, EO may be then ring-opening addition polymerized to terminals of (K). The method in ring-opening addition polymerizing EO to (K) may be carried out under conditions generally known and a catalyst is not particularly limited. When EO is not addition polymerized to terminals of (K), (K) is (a) and it is preferable that the hydroxyl value x and the total degree of unsaturation y of (a) satisfy the relation of mathematical expression (1).

[Chem. 9]

$$R^2—[—(ZO)p-H]m \qquad (XI)$$

[Chem. 10]

$$R^2—[—(ZO)p-(AO)q-H]m \qquad (XII)$$

In general formula (XI), $R^2$, Z, p, and m are the same as those in general formula (II) and the above-mentioned examples can also be provided as examples of them.

In general formula (XII), $R^2$, Z, A, p, q, and m are the same as those in general formula (II) and the above-mentioned examples can also be provided as examples of them.

Specific examples of the active hydrogen-containing compound (J) include compounds the same as the above-mentioned examples of the active hydrogen-containing compound (H) when p is 0.

When p is 1 or more, one example is a compound obtained by adding a $C_{2-12}$ alkylene oxide to the above-mentioned one in which p is 0, namely, (H). The catalyst to be used in the addition reaction is not limited.

Specific examples of (J) include adducts of EO, PO, butylene oxide, and the like to (H). More specific examples include EO adducts of water, PO adducts of water, EO adducts of glycerol, PO adducts of glycerol, ethylene oxide adducts of ammonia, propylene oxide adducts of ammonia, EO-PO copolymer adducts of water, PO-butylene oxide copolymer adducts of water, EO-PO copolymer adducts of glycerol, EO-butylene oxide copolymer adducts of glycerol, PO-butylene oxide copolymer adducts of glycerol, ethylene oxide-propylene oxide copolymer adducts of ammonia, EO-PO-butylene oxide copolymer adducts of water, EO-PO-butylene oxide copolymer adducts of glycerol, EO-PO-butylene oxide copolymer adducts of ammonia, and the like.

Examples of the active hydrogen compound (K) include compounds obtained by addition polymerizing a $C_{3-12}$ alkylene oxide to the active hydrogen-containing compound (J). The catalyst to be used for this addition polymerization is preferably the following catalyst (C) because the polyol (a) is easily obtained.

Examples of (K) include adducts of PO, butylene oxide, and the like to (J).

From the viewpoint of reactivity, the total content of one kind or two or more kinds of zinc, iron, cobalt, chromium, and manganese of the polyol (a) is preferably 2 ppm or less, more preferably 1 ppm or less.

The catalyst (C) is a compound represented by the following general formula (VII-1), (VII-2), or (VII-3). By ring-opening addition polymerizing a $C_{3-12}$ alkylene oxide using this, a ring-opened polymer can be obtained in good yield and a polyoxyalkylene polyol with a high primary hydroxyl group ratio of terminal hydroxyl groups can be obtained.

[Chem. 11]

$$X \!-\!\!\!-\!\!\!(R^5)_3 \quad \text{(VII-1)}$$

[Chem. 12]

$$\begin{array}{c} F \\ | \\ X \!-\!\!\!-\!\!\!(R^5)_2 \end{array} \quad \text{(VII-2)}$$

[Chem. 13]

$$\begin{array}{c} F_2 \\ | \\ X \!-\!\!\!-\!\!\!(R^5) \end{array} \quad \text{(VII-3)}$$

In the above general formula (VII-1), (VII-2), or (VII-3), the individual X represents a boron atom or an aluminum atom. From the viewpoint of reactivity, a boron atom is preferred.

$R^5$ in general formula (VII-1), (VII-2), or (VII-3) represents a (substituted) phenyl group represented by the following general formula (VIII) or a tertiary alkyl group represented by the following general formula (IX), wherein when there are a plurality of $R^5$'s, the plurality of $R^5$'s may be the same or different from each other.

[Chem. 14]

(VIII)

[Chem. 15]

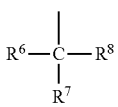

(IX)

Y's in the above general formula (VIII) each represent a hydrogen atom, a $C_{1-4}$ alkyl group, a halogen atom, a nitro group, or a cyano group, and they may be the same or different. Among these, a hydrogen atom, a halogen atom, and a cyano group are preferred, and a halogen atom and a cyano group are more preferred.

k represents a number of 0 to 5.

Specific examples of the phenyl group or the substituted phenyl group represented by general formula (VIII) include a phenyl group, a pentafluorophenyl group, a p-methylphenyl group, a p-cyanophenyl group, a p-nitrophenyl group, and the like. A phenyl group, a pentafluorophenyl group, and a p-cyanophenyl group are preferred, and a phenyl group and a pentafluorophenyl group are more preferred.

$R^6$, $R^7$, or $R^8$ in the above general formula (IX) each independently represent a $C_{1-4}$ alkyl group and they may be the same or different. Specific examples include a methyl group, an ethyl group, a propyl group, an isopropyl group, and the like. Specific examples of the tertiary alkyl group represented by general formula (IX) include a tert-butyl group, a tert-pentyl group, and the like.

Specific examples of the catalyst (C) include triphenylborane, diphenyl-tert-butylborane, tri(tert-butyl)borane, triphenylaluminum, tris(pentafluorophenyl)borane, and tris(pentafluorophenyl)aluminum.

The number of moles of addition of the alkylene oxide to be added in obtaining an active hydrogen compound (K) by adding an alkylene oxide to an active hydrogen-containing compound (J) in the presence of the catalyst (C) is preferably 1 mol to 200 mol, more preferably 1 to 100 mol per the active hydrogen of the active hydrogen-containing compound (J) and it is selected appropriately according to the molecular weight of a ring-opened polymer to be produced and its intended application.

The amount of the catalyst (C) used, which is not particularly limited, is preferably 0.0001 to 10% by weight, more preferably 0.0005 to 1% by weight relative to the ring-opened polymer to be produced.

In obtaining the above-mentioned active hydrogen compound (K) represented by general formula (XII) by adding an alkylene oxide to an active hydrogen-containing compound (J) in the presence of a catalyst (C), it is preferable to remove a by-produced low-boiling point compound (t) having a boiling point of 150° C. or less under a pressure of 0.1 MPa continuously or intermittently because a polyol (a) that satisfies the above-mentioned mathematical expression (1) is obtained easily. The method of the removal may be carried out by any of the generally known methods. Examples of such a method include a method in which (t) is removed from a reaction mixture by heating and/or reducing pressure, a method in which the vapor phase in a reaction vessel is extracted from the reaction vessel by using a vapor phase circulation pump and then (t) is removed with an adsorbent, a method in which the vapor phase in a reaction vessel is extracted from the reaction vessel by using a vapor phase circulation pump and then (t) is caused to react using a catalyst to form a high-boiling point compound, and then separated, a method in which the vapor phase in a reaction vessel is extracted from the reaction vessel by using a vapor phase circulation pump and then (t) is separated by distillation, and the like.

Specific examples of the by-produced low-boiling point compound (t) having a boiling point of 150° C. or less under a pressure of 0.1 MPa include formaldehyde (boiling point −19° C.), acetaldehyde (boiling point 20° C.), propionaldehyde (boiling point 48° C.), a compound in which 0 to 2 mol of AO has been added to allyl alcohol, and the like. In adding AO, (t) is often generated in an amount of 0.0001 to 10% by weight based on the weight of the polyol (a).

In adding AO to an active hydrogen-containing compound (J), it is permitted to charge three kinds, i.e., the active hydrogen-containing compound (J), AO, and a catalyst (C), at once and cause them to react, or it is also permitted to drop AO into a mixture of the active hydrogen-containing compound (J) and a catalyst (C) and then cause them to react, or it is also permitted to drop AO and a catalyst (C) into the active hydrogen-containing compound (J) and then cause them to react. From the viewpoint of the control of reaction temperature, the method involving dropping AO into a mixture of the active hydrogen-containing compound (J) and a catalyst (C) or the method involving dropping AO and a catalyst (C) into the active hydrogen-containing compound (J) is preferred.

The temperature at which AO is added to the active hydrogen-containing compound (J) is preferably 0° C. to 250° C., more preferably 20° C. to 180° C.

The produced polyol (a) contains the catalyst (C), and decomposition and/or removal treatment of the catalyst (C) is performed if necessary depending upon the intended application of the polyol (a).

One example of the decomposition method is a method involving adding water and/or an alcohol compound and, if necessary, a basic substance such as an alkali compound. The alcohol and/or phenol previously described can be used as the alcohol compound. Examples of the alkali compound include alkali metal hydroxides (e.g., potassium hydroxide, sodium hydroxide, and cesium hydroxide), alkaline metal alcoholates (e.g., potassium methylate and sodium methylate), and a mixture of two or more kinds of them. Among these, alkali metal hydroxides are preferred from the viewpoint of productivity. In the decomposition, the decomposition temperature is preferably 10° C. to 180° C., more preferably 80 to 150° C. The decomposition may be performed in a hermetically-sealed state or may be performed under exhaustion in connection to a vacuum source or may be performed under continuous addition of water or an alcohol compound. The water or alcohol to be added may be added either in a liquid state or in a vapor or solid state. The amount of the water and/or alcohol compound used is preferably 0.1 to 100% by weight, more preferably 1 to 20% by weight based on the weight of the addition product. The amount of the alkali compound used is preferably 0.1 to 10% by weight, more preferably 0.3 to 2% by weight based on the weight of the addition product.

The method of the removal may be carried out by any of the generally known methods. For example, hydrotalcite-based adsorbents {e.g., Kyoward 500, Kyoward 1000, and Kyoward 2000 (all produced by Kyowa Chemical Industry Co., Ltd.)}, filter aids, such as diatomaceous earth {e.g., Radiolite 600, Radiolite 800, and Radiolite 900 (all produced by Showa Chemical Industry Co., Ltd.)}, and the like can be used. Filtration may be either pressure filtration or filtration under reduced pressure, but pressure filtration is preferred because the contamination of oxygen can thereby be prevented easily. The material of a filter is not particularly limited. Examples thereof include paper, polypropylene, polytetrafluoroethylene, polyester, polyphenylene sulfide, acrylic, meta aramid, and the like, and paper is preferred. The diameter of captured particles of the filter is preferably 0.1 to 10 μm, more preferably 1 to 5 μm.

Even if the catalyst (C) remains in the polyol (a), it does not have a serious adverse influence on the reactivity between a polyol and an isocyanate in the following urethanization reaction or the like as compared with conventional alkaline catalysts. However, from the viewpoint of prevention of coloring, it is preferable to decompose and/or remove the remaining catalyst.

That the polyol (PL) for polyurethane preparation contains the polyol (a) includes that the polyol (PL) contains a polymer polyol (W) obtained by polymerizing a vinyl monomer (g) in (a).

The polymer polyol (W) is a polymer polyol in which polymer particles (P) have been dispersed in (a).

The polymer polyol (W) can be produced by polymerizing a vinyl monomer (g) in (a) by a publicly known method. One example is one which has been prepared by polymerizing the vinyl monomer (g) in the presence of a radical polymerization initiator in (a) and in which the resulting polymer of (g) has been dispersed stably. Specific examples of the polymerization method include the methods disclosed in U.S. Pat. No. 3,383,351, JP-B-39-25737, etc.

Styrene and/or acrylonitrile is preferred as (g).

The strength-enhancing agent (b) is a compound that is at least one compound selected from the group consisting of an ester compound, a thioester compound, a phosphoric acid ester compound, and an amide compound, and that is derived from an aromatic polyvalent carboxylic acid with a valence of 2 or higher. (b) has a structure in which an aromatic polyvalent carboxylic acid with a valence of 2 or higher and an active hydrogen-containing compound (e.g., at least one compound selected from the group consisting of a hydroxyl group-containing compound, a thiol group-containing compound, a phosphoric acid compound, and an amino group-containing compound) have been condensed.

The term "aromatic polyvalent carboxylic acid with a valence of 2 or higher" means any compound that satisfies the following (1) to (3):
(1) the number of the aromatic ring(s) which one molecule has is 1 or more,
(2) the number of the carboxyl groups which one molecule has is 2 or more, and
(3) a carboxyl group is bonded directly to an aromatic ring.

The number of the aromatic ring(s) which one molecule of the aromatic polyvalent carboxylic acid with a valence of 2 or higher has is 1 or more, and from the viewpoints of the mechanical properties of a polyurethane and the compatibility with a polyol, it is preferably 1 to 4, and more preferably 1.

The number of the carboxyl groups which one molecule of the aromatic polyvalent carboxylic acid with a valence of 2 or higher has is 2 or more, and from the viewpoints of the mechanical properties of a polyurethane and handling (viscosity) in molding, it is preferably 2 to 4, more preferably 3 to 4, and even more preferably 3.

Examples of the aromatic polyvalent carboxylic acid with a valence of 2 or higher include aromatic polycarboxylic acids having 8 to 18 carbon atoms, such as phthalic acid, isophthalic acid, terephthalic acid, 2,2'-bibenzyldicarboxylic acid, trimellitic acid, hemimellitic acid, trimesic acid, pyromellitic acid and naphthalene-1,4 dicarboxylic acid, naphthalene-2,3,6 tricarboxylic acid, diphenic acid, 2,3-anthracenedicarboxylic acid, 2,3,6-anthracenetricarboxylic acid, and pyrenedicarboxylic acid.

From the viewpoint of the mechanical properties of a polyurethane, phthalic acid, isophthalic acid, terephthalic acid, trimellitic acid, pyromellitic acid and naphthalene-1,4 dicarboxylic acid are preferred as the aromatic polyvalent carboxylic acid with a valence of 2 or higher, trimellitic acid and pyromellitic acid are more preferred, and trimellitic acid is even more preferred.

Examples of the hydroxyl group-containing compound include monohydric alcohols, di- to octahydric polyhydric alcohols, phenols, polyhydric phenols, and the like. Specific examples include monohydric alcohols, such as methanol, ethanol, butanol, octanol, benzyl alcohol, and naphthylethanol; dihydric alcohols, such as ethylene glycol, propylene glycol, 1,3- and 1,4-butanediol, 1,6-hexanediol, 1,10-decanediol, diethylene glycol, neopentyl glycol, cyclohexanediol, cyclohexane dimethanol, 1,4-bis(hydroxymethyl)cyclohexane, and 1,4-bis(hydroxyethyl)benzene; trihydric alcohols, such as glycerol and trimethylolpropane; tetra- to octahydric alcohols, such as pentaerythritol, sorbitol, mannitol, sorbitan, diglycerol, dipentaerythritol, sucrose, glucose, mannose, fructose, methyl glucoside, and derivatives thereof; phenols, such as phenol, phloroglucine, cresol, pyrogallol, catechol, hydroquinone, bisphenol A, bisphenol F, bisphenol S, 1-hydroxynaphthalene, 1,3,6,8-tetrahydroxynaphthalene, anthrol, 1,4,5,8-tetrahydroxyanthracene, and 1-hydroxypyrene; polybutadiene polyols; castor oil-based polyols; polyfunctional (e.g., the number of functional groups is 2 to 100) polyols, such as (co)polymers of hydroxyalkyl(meth)acrylates, and polyvinyl alcohol, condensates of phenol and formaldehyde (novolac), the polyphenol disclosed in U.S. Pat. No. 3,265,641, and the like.

(Meth)acrylate means methacrylate and/or acrylate, and the same shall apply hereinafter.

Examples of the thiol group-containing compound include monofunctional phenyl thiols, alkyl thiols, and polythiol compounds. Examples of the polythiols include di- to octavalent polythiols. Specific examples include ethylene dithiol, 1,6-hexanedithiol, and the like.

Examples of the phosphoric acid compound include phosphoric acid, phosphorous acid, phosphoric acid, and the like.

Examples of the amino group-containing compound include amines, polyamines, aminoalcohols, and the like. Specific examples include ammonia; monoamines, such as alkylamines having 1 to 20 carbon atoms (e.g., butylamine) and aniline; aliphatic polyamines, such as ethylenediamine, hexamethylenediamine, and diethylenetriamine; heterocyclic polyamines, such as piperazine and N-aminoethylpiperazine; alicyclic polyamines, such as dicyclohexylmethanediamine and isophoronediamine; aromatic polyamines, such as phenylenediamine, tolylenediamine, and diphenylmethanediamine; alkanolamines, such as monoethanolamine, diethanolamine, and triethanolamine; polyamidepolyamines obtained by condensation of a dicarboxylic acid with an excess of polyamine; polyetherpolyamines; hydrazines (e.g., hydrazine and monoalkylhydrazine), dihydrazides (e.g., succinic acid dihydrazide and terephthalic acid dihydrazide), guanidines (e.g., butylguanidine and 1-cyanoguanidine); and dicyandiamides, and the like.

Compounds having two or more kinds of active hydrogen-containing functional groups (e.g., a hydroxyl group, an amino group, a carboxyl group, a thiol group, and a phosphate group) in a molecule can also be used as the active hydrogen-containing compound.

Alkylene oxide adducts of the above-mentioned active hydrogen-containing compounds can also be used as the active hydrogen-containing compound.

Examples of the AO to be added to active hydrogen-containing compounds include AOs having 2 to 6 carbon atoms, such as EO, PO, 1,3-propylene oxide, 1,2-butylene oxide, and 1,4-butylene oxide. Among these, PO, EO, and 1,2-butylene oxide are preferred from the viewpoints of properties and reactivity. In the case where two or more kinds of AOs are used (e.g., PO and EO), the method of addition may be either block addition or random addition, and a combination thereof is also applicable.

Moreover, active hydrogen-containing compounds (polyester compounds) obtained by condensation reactions of the above-mentioned active hydrogen-containing compounds with polycarboxylic acids [aliphatic polyvalent carboxylic acids and aromatic polyvalent carboxylic acids with a valence of 2 or higher (the same as described above)] can be used as an active hydrogen-containing compound. As to each of the active hydrogen-containing compound and the polycarboxylic acid in such a condensation reaction, one kind may be used or alternatively two or more kinds may be used in combination.

The term "aliphatic polycarboxylic acid" means any compound that satisfies the following (1) and (2):
(1) the number of the carboxyl groups which one molecule has is 2 or more, and
(2) no carboxyl group is bonded directly to an aromatic ring.

Examples of the aliphatic polycarboxylic acid include succinic acid, adipic acid, sebacic acid, maleic acid, fumaric acid, and the like.

In performing a condensation reaction between an aromatic polyvalent carboxylic acid with a valence of 2 or higher with an active hydrogen-containing compound, it is also permitted to use an anhydride or a lower alkyl ester of an aromatic polyvalent carboxylic acid with a valence of 2 or higher.

From the viewpoint of the improvement in the mechanical properties of a polyurethane, the strength-enhancing agent (b) is preferably a compound represented by the following general formula (XIII):

[Chem. 16]

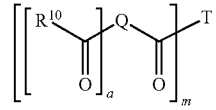

(XIII)

[in general formula (XIII), $R^{10}$ represents a residue resulting from the removal of one active hydrogen atom from an active hydrogen-containing compound, wherein the plurality of $R^{10}$'s may be the same or different; Q represents a residue resulting from the removal of a carboxyl group from an aromatic polycarboxylic acid (CA) with a valence of 3 or higher, wherein the aromatic ring of Q is composed of carbon atoms, and the substituents positioned on the aromatic ring may each be either a hydrogen atom or a different substituent, but at least one substituent is a hydrogen atom; a is an integer that satisfies 2≤a≤(the number of the aromatic ring substituents−2); T represents a residue resulting from the removal of m active hydrogen atoms from an active hydrogen-containing compound with a valence of m or higher; and m represents an integer of 1 to 10].

$R^{10}$ is a residue resulting from the removal of one active hydrogen atom from an active hydrogen-containing compound. From the viewpoints of handling of a strength-enhancing agent and improvement in the mechanical properties (elongation, tensile strength, compressive hardness) of a polyurethane, hydroxyl group-containing compounds, amino group-containing compounds, AO adducts thereof, and polyester compounds obtained by a condensation reaction of an active hydrogen-containing compound with a polycarboxylic acid are preferred as the active hydrogen-containing compound, and methanol, ethanol, butanol, ethylene glycol, propylene glycol, glycerol, pentaerythritol, sorbitol, sucrose, benzyl alcohol, phenol, methylamine, dimethylamine, ethylamine, diethylamine, butylamine, dibutylamine, phenylamine, diphenylamine, EO and/or PO adducts thereof, and condensates of such an active hydrogen compound with phthalic acid and/or isophthalic acid are more preferred.

In general formula (XIII), Q represents a residue resulting from the removal of a carboxyl group from an aromatic polycarboxylic acid (CA) with a valence of 3 or higher. The aromatic ring of Q is composed of carbon atoms. Although the substituents positioned on the aromatic ring may each be either a hydrogen atom or a different substituent, at least one substituent is a hydrogen atom. In other words, the aromatic ring of Q has at least one hydrogen atom bonded to a carbon atom constituting the aromatic ring.

Examples of the different substituent include an alkyl group, a vinyl group, an allyl group, a cycloalkyl group, a halogen atom, an amino group, a carbonyl group, a carboxyl group, a hydroxyl group, a hydroxyamino group, a nitro group, a phosphino group, a thio group, a thiol group, an aldehyde group, an ether group, an aryl group, an amide group, a cyano group, a urea group, a urethane group, a sulfone group, an ester group, an azo group, and the like. From the viewpoints of improvement in the mechanical properties (elongation, tensile strength, tear strength, compressive hardness) of a polyurethane and cost, an alkyl group, a vinyl group, an allyl group, an amino group, an amide group, a urethane group, and a urea group are preferred as the different substituent.

As to the arrangement of substituents on Q, from the viewpoint of improvement in the mechanical properties of a polyurethane, preferred is an arrangement in which two carbonyl groups adjoin each other and hydrogen is positioned as a substituent between a third carbonyl group and the first or second carbonyl group.

Examples of the aromatic polycarboxylic acid (CA) with a valence of 3 or higher constituting Q include aromatic polycarboxylic acids having 8 to 18 carbon atoms, such as trimellitic acid, hemimellitic acid, trimesic acid, pyromellitic acid, naphthalene-2,3,6 tricarboxylic acid, and 2,3,6-anthracene tricarboxylic acid.

From the viewpoints of handling of a strength-enhancing agent and improvement in the mechanical properties (tensile strength, tear strength, compressive hardness) of a polyurethane, the (CA) to be used for Q is preferably a monocyclic compound, and trimellitic acid and pyromellitic acid are more preferred.

a in general formula (XIII) is an integer that satisfies 2≤a≤the number of the aromatic ring substituents−2. The number of the aromatic ring substituents is the number of the substituents bonded to carbon atoms constituting an aromatic ring. For example, in a monocyclic aromatic ring composed of 6 carbon atoms, the number of the aromatic ring substituents is 6 and therefore a can be 2 to 4. In the case where the aromatic ring is a monocyclic aromatic ring, from the viewpoint of improvement in the mechanical properties (tensile strength, tear strength, compressive hardness) of a polyurethane, a is preferably 2 or 3.

T in general formula (XIII) represents a residue resulting from the removal of m active hydrogen atoms from an active hydrogen-containing compound with a valence of m or higher. The active hydrogen-containing compound referred to here includes the above-mentioned active hydrogen-containing compound represented by $R^{10}$.

In general formula (XIII), m represents an integer of 1 to 10.

T is a residue resulting from the removal of m active hydrogen atoms from an active hydrogen-containing compound with a valence of m or higher. From the viewpoints of handling of a strength-enhancing agent and improvement in the mechanical properties (tensile strength, tear strength, compressive hardness) of a polyurethane foam, hydroxyl group-containing compounds, amino group-containing compounds, AO adducts thereof, and polyester compounds obtained by a condensation reaction of an active hydrogen-containing compound with a polycarboxylic acid are preferred as the active hydrogen-containing compound used for T, and methanol, ethanol, butanol, ethylene glycol, propylene glycol, glycerol, pentaerythritol, sorbitol, sucrose, benzyl alcohol, phenol, methylamine, dimethylamine, ethylamine, diethylamine, butylamine, dibutylamine, phenylamine, diphenylamine, EO and/or PO adducts thereof, and condensates of such an active hydrogen compound with phthalic acid and/or isophthalic acid are more preferred. m is preferably 1 to 8.

From the viewpoints of improvement in the mechanical properties of a polyurethane and compatibility with a polyol, the formula weight of T is preferably 48 to 3000, more preferably 60 to 2500.

From the viewpoints of handling (viscosity) at the time of molding and tensile strength, the hydroxyl value (mgKOH/g) of the strength-enhancing agent (b) is preferably 0 to 700, more preferably 0 to 650, and even more preferably 0 to 600.

In the present invention, the hydroxyl value is measured in accordance with JIS K-1557.

The event that (b) has a hydroxyl value of 0 and is represented by general formula (XIII) means that none of $R^{10}$, Q and T in general formula (XIII) has a hydroxyl group.

From the viewpoint of improvement in the mechanical properties (elongation, tensile strength) of a polyurethane, the aromatic ring concentration (mmol/g) of the strength-enhancing agent (b) is preferably 0.1 to 10.0, more preferably 0.2 to 9.5, and even more preferably 0.3 to 9.0.

The aromatic ring concentration of (b) means the number of moles of aromatic rings contained in 1 g of the strength-enhancing agent (b).

From the viewpoint of improvement in mechanical properties (tensile strength, tear strength, compressive hardness), the content of Q originating in the (CA) with a valence of 3 or higher, based on the number average molecular weight of the strength-enhancing agent (b), is preferably 0.5 to 50%, more preferably 4 to 47%, and even more preferably 6 to 45%.

From the viewpoints of handling (the viscosity of the polyol component (a)) at the time of molding, and tensile strength and elongation property, the concentration (mmol/g) of the carbonyloxy groups (—COO—) of the strength-enhancing agent (b) is preferably 0.5 to 15, more preferably 1.0 to 12, and even more preferably 1.5 to 10.

From the viewpoint of the mechanical properties of a polyurethane, the content of the polyol (a) based on the weight of the polyol (PL) is preferably 10 to 99.9% by weight, more preferably 20 to 99.5% by weight, and even more preferably 40 to 99% by weight.

From the viewpoints of tensile strength and elongation property, the content of the strength-enhancing agent (b) based on the weight of the polyol (PL) is preferably 0.1 to 90% by weight, more preferably 0.5 to 80% by weight, and even more preferably 1 to 60% by weight. In the present invention, also in the case where a strength-enhancing agent (b) is contained in the polymer polyol to be used, the case is treated as if (b) is contained in the polyol component (PL).

In the present invention, any substance that corresponds to the strength-enhancing agent (b) shall be dealt with as a strength-enhancing agent (b) and shall not be dealt with as a polyol (a).

The polyol (PL) for polyurethane preparation of the present invention should just comprise a polyol (a) and a strength-enhancing agent (b), and the method for the preparation thereof may be a method that involves mixing (a) with (b), for example.

The polyol (PL) for polyurethane preparation of the present invention can be used for various applications and can be used suitably for preparing a foamed or non-foamed polyurethane.

That is, in preparing a foamed or non-foamed polyurethane by causing a polyol component and an isocyanate component to react together, if necessary, in the presence of an additive, (PL) is used as at least part of the polyol component.

The method for preparing a polyurethane in which (PL) is used for the preparation of the polyurethane includes a method for preparing a polyurethane by causing a polyol component and an isocyanate component to react together, wherein the polyol component contains the above-mentioned polyol (PL) in an amount of 10 to 100% by weight based on the weight of the polyol component.

As the isocyanate component, those having heretofore been used for polyurethane preparation can be used. Examples of such isocyanates include aromatic polyisocyanates, aliphatic polyisocyanates, alicyclic polyisocyanates, araliphatic polyisocyanates, modified products thereof (e.g., urethane group, carbodiimide group, allophanate group, urea group, biuret group, isocyanurate group or oxazolidone group-containing modified products), and a mixture of two or more kinds of these.

Examples of the aromatic polyisocyanates include $C_{6-16}$ (excluding the carbon in an NCO group; the same shall apply to the following isocyanates) aromatic diisocyanates, $C_{6-20}$ aromatic triisocyanates, crude products of these isocyanates, and the like. Specific examples include 1,3- and/or 1,4-phenylenediisocyanate, 2,4- and/or 2,6-tolylenediisocyanate (TDI), crude TDI, 2,4'- and/or 4,4'-diphenylmethanediisocyanate (MDI), polymethylene polyphenyl isocyanate (crude MDI), and the like.

Examples of the aliphatic polyisocyanates include $C_{6-10}$ aliphatic diisocyanates, and the like. Specific examples include 1,6-hexamethylene diisocyanate, lysine diisocyanate, and the like.

Examples of the alicyclic polyisocyanates include $C_{6-16}$ alicyclic diisocyanates, and the like. Specific examples include isophorone diisocyanate (IPDI), 4,4'-dicyclohexylmethane diisocyanate, norbornane diisocyanate, and the like.

Examples of the araliphatic polyisocyanates include $C_{8-12}$ araliphatic diisocyanates, and the like. Specific examples include xylylene diisocyanate, α,α,α',α'-tetramethylxylylene diisocyanate, and the like.

Specific examples of the modified polyisocyanates include urethane-modified MDI, carbodiimide-modified MDI, and the like.

In the preparation of a polyurethane, if necessary, the reaction may be performed in the presence of the additives described below.

In producing a polyurethane foam, a foaming agent is used.

As the foaming agent, there can be used publicly known foaming agents, examples of which include water, hydrogen atom-containing halogenated hydrocarbons, low-boiling point hydrocarbons, liquefied carbon dioxide gas, and the like. Two or more kinds foaming agents may be used in combination.

Specific examples of the hydrogen atom-containing halogenated hydrocarbons include methylene chloride, those of HCFC (hydrochlorofluorocarbon) type (e.g., HCFC-123 and HCFC-141b); those of HFC (hydrofluorocarbon) type (e.g., HFC-245fa and HFC-365mfc); and the like.

The low-boiling point hydrocarbons are hydrocarbons usually having a boiling point of −5 to 70° C. and specific examples thereof include butane, pentane, and cyclopentane.

When the foaming agent is water, the amount of the foaming agent used relative to 100 parts of the polyol component is preferably 0.1 to 30 parts, more preferably 1 to 20 parts. The amount of the hydrogen atom-containing halogenated hydrocarbon is preferably 50 parts or less, more preferably 10 to 45 parts. The amount of the low-boiling point hydrocarbon is preferably 40 parts or less, more preferably 10 to 30 parts. The amount of the liquefied carbon dioxide gas is preferably 30 parts or less, more preferably 1 to 25 parts.

In the above and following descriptions, "part" means "part by weight".

Furthermore, the reaction may be performed in the presence of publicly known additives such as foam stabilizers (e.g., dimethylsiloxane-based and polyether-modified dimethylsiloxane-based), urethanization catalysts {tertiary amine-based catalysts (e.g., triethylenediamine, N-ethylmorpholine, diethylethanolamine, N,N,N',N'-tetramethylhexamethylenediamine, tetramethylethylenediamine, diaminobicyclooctane, 1,2-dimethylimidazole, 1-methylimidazole, and 1,8-diazabicyclo[5,4,0]-undecene-7) and/or metal catalysts (e.g., stannous octylate, stannic dibutyl dilaurate, and lead octylate}, coloring agents (dyes and pigments), plasticizers (e.g., phthalic esters and adipic esters), organic fillers (e.g., synthetic short fibers and hollow microspheres made of a thermoplastic or thermosetting resin), flame retardants (e.g., phosphoric acid esters and chlorinated phosphoric acid esters), anti-aging agents (e.g., triazole and benzophenone), and antioxidants (e.g., hindered phenols and hindered amines).

As to the amount of such additives used relative to 100 parts of the polyol component, the amount of the foam stabilizer is preferably 10 parts or less, more preferably 0.5 to 5 parts. The amount of the urethanization catalyst is preferably 10 parts or less, more preferably 0.2 to 5 parts. The amount of the coloring agent is preferably 1 part or less. The amount of the plasticizer is preferably 10 parts or less, more preferably 5 parts or less. The amount of the organic filler is preferably 50 parts or less, more preferably 30 parts or less. The amount of the flame retardant is preferably 30 parts or less, more preferably 5 to 20 parts. The amount of the anti-aging agent is preferably 1 part or less, more preferably 0.01 to 0.5 parts. The amount of the antioxidant is preferably 1 part or less, more preferably 0.01 to 0.5 parts. The total amount of the additives used is preferably 50 parts or less, more preferably 0.2 to 30 parts.

The isocyanate index (NCO INDEX) [(NCO group/active hydrogen atom-containing group) equivalent ratio×100] in the preparation of the polyurethane of the present invention is preferably 80 to 150, more preferably 85 to 135, and particularly preferably 90 to 130.

From the viewpoint of the tensile strength of a polyurethane foam, the content of the polyol (PL) for polyurethane preparation in the polyol component is preferably 10 to 100% by weight, more preferably 20 to 80% by weight, and even more preferably 30 to 60% by weight based on the weight of the polyol component.

The conditions under which a polyol component and an isocyanate component are cause to react may be publicly known conditions usually used.

In one example, first, a polyol component and, if necessary, an additive are mixed in prescribed amounts. Subsequently, this mixture is mixed with an isocyanate component at a high speed by using a polyurethane low-pressure or high-pressure injection foaming machine or stirring machine. The resulting mixed liquid is poured into a sealed type or open type mold (made of metal or resin), caused to undergo a urethanization reaction to cure for a prescribed period of time, and then released from the mold, whereby a polyurethane is obtained.

EXAMPLES

The present invention is further described below with reference to examples, but the invention is not limited thereto.

Production Example 1

Production of Polyol a-1

As in the embodiment depicted in FIG. 1, a 2500-ml capacity stainless steel autoclave, as a reaction vessel (1), equipped with a stirring apparatus, a temperature controlling apparatus, and a feed supply line (5), a reaction column (2) (two stainless steel cylindrical tubes, 5.5 cm in inner diameter and 30 cm in length, were used) filled with 400 parts of magnesium oxide (granule, 2 to 0.1 mm in diameter), and a distillation column (3) (30 theoretical plates, a stainless steel cylindrical tube, 5.5 cm in inner diameter, 2 m in length) were connected by circulation lines (6), (7), and (8).

Into the reaction vessel (1) were charged 400 g of a glycerol-PO adduct (hydroxyl value 280) and 0.09 g of tris(pentafluorophenyl)borane, and then the pressure in the autoclave {reaction vessel (1)}, the reaction column (2) and the circulation lines (6), (7), and (8) was reduced to 0.005 MPa. While supplying PO to a liquid phase continuously through the feed supply line (5) so that the reaction temperature might be maintained at 50 to 60° C., the vapor phase in the reaction vessel (1) was circulated by using a diaphragm pump at a flow rate of 5 L/min in a sequence of reaction vessel (1)→circulation line (6)→reaction column (2)→circulation line (7)→distillation column (3)→circulation line (8)→reaction vessel (1). While controlling the reaction column (2) to be at 75° C. and 0.08 to 0.15 MPa, by-produced low-boiling point compounds were continuously brought into contact with magnesium oxide, thereby being converted into high-boiling point compounds, which were then separated from PO in the distillation column (3) and thereby removed out of the system. The separated high-boiling point compounds were extracted through a bottom line (4) of the distillation column (3). Once the amount of the liquid in the autoclave {reaction vessel (1)} became 2000 ml, the supply of PO was stopped and the vapor phase circulation was ended. After maturation at 70° C. for 4 hours, 200 g of water was added and was heated at 130 to 140° C. for 1 hour. After heating for 1 hour, water was distilled off under normal pressure over 2 hours, and then the remaining water was distilled off under reduced pressure over 3 hours while maintaining the pressure at 30 to 50 torr under the introduction of steam, whereby a liquid glycerol-PO adduct (a-1) was obtained.

The glycerol-PO adduct used as a raw material was a product synthesized by a known method, that is, a product obtained by adding a prescribed amount of propylene oxide to glycerol using potassium hydroxide as a catalyst, then adding water and synthesized silicate (Kyoward 600, produced by Kyowa Chemical Industry Co., Ltd.), and performing heat treatment for removing the catalyst, filtration, and subsequent dehydration under reduced pressure.

Production Example 2

Production of Polyol a-2

Figure 2:
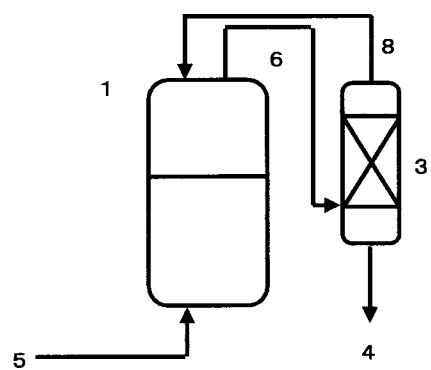
FIG. 2 is a diagram illustrating the reaction apparatus of Production Examples 2 and 6.

As in the embodiment depicted in FIG. 2, a 2500-ml capacity stainless steel autoclave, as a reaction vessel (1), equipped with a stirring apparatus, a temperature controlling apparatus, and a feed supply line (5) and a distillation column (3) (50 theoretical plates, a stainless steel cylindrical tube, 5.5 cm in inner diameter, 3 m in length) were connected by circulation lines (6) and (8).

Into the reaction vessel (1) were charged 400 g of a glycerol-PO adduct (hydroxyl value 280) and 0.09 g of tris(pentafluorophenyl)borane, and then the pressure in the autoclave {reaction vessel (1)}, the reaction column (2) and the circulation lines (6) and (8) was reduced to 0.005 MPa. While supplying PO to a liquid phase continuously through the feed supply line (5) so that the reaction temperature might be maintained at 50 to 60° C., the vapor phase in the reaction vessel (1) was circulated by using a diaphragm pump at a flow rate of 5 L/min in a sequence of reaction vessel (1)→circulation line (6)→distillation column (3)→circulation line (8)→reaction vessel (1). By-produced low-boiling point compounds were separated from PO in the distillation column (3), thereby being removed out of the system. The separated by-produced low-boiling point compounds were extracted through a bottom line (4) of the distillation column (3). Once the amount of the liquid in the autoclave {reaction vessel (1)} became 2000 ml, the supply of PO was stopped and the vapor phase circulation was ended. After maturation at 70° C. for 4 hours, 200 g of water was added and was heated at 130 to 140° C. for 1 hour. After heating for 1 hour, water was distilled off under normal pressure over 2 hours, and then the remaining water was distilled off under reduced pressure over 3 hours while maintaining the pressure at 30 to 50 torr under the introduction of steam, whereby a liquid glycerol-PO adduct (a-2) was obtained.

The glycerol-PO adduct used as a raw material was the same as that used in Production Example 1.

Production Example 3

Production of Polyol a-3

Figure 3:
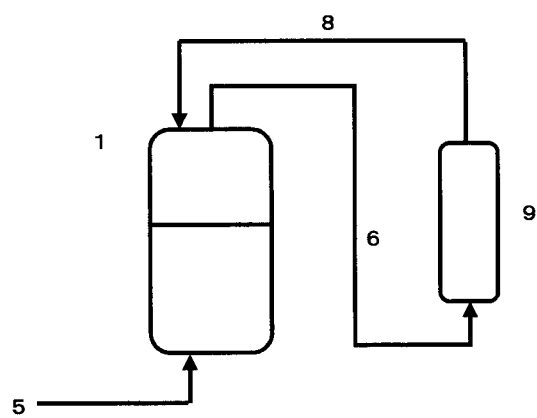
FIG. 3 is a diagram illustrating the reaction apparatus of Production Example 3.

As in the embodiment depicted in FIG. 3, a 2500-ml capacity stainless steel autoclave, as a reaction vessel (1), equipped with a stirring apparatus, a temperature controlling apparatus, and a feed supply line (5) and an adsorption column (9) (a stainless steel cylindrical tube, 5.5 cm in inner diameter, 30 cm in length) filled with 500 parts of molecular sieve 4A were connected by circulation lines (6) and (8).

After 400 g of a glycerol-PO adduct (hydroxyl value 280) and 0.09 g of tris(pentafluorophenyl)borane were charged, the pressure in the autoclave {reaction vessel (1)}, the adsorption column (9) and the lines (6) and (8) was reduced to 0.005 MPa. While supplying PO continuously through the feed supply line (5) so that the reaction temperature might be maintained at 50 to 60° C., the vapor phase in the reaction vessel (1) was circulated by using a diaphragm pump at a flow rate of 5 L/min in a sequence of reaction vessel (1)→circulation line (6)→adsorption column (9)→circulation line (8)→reaction vessel (1). Under the control of the adsorption column (9) at 25° C. and 0.1 to 0.3 MPa, a by-produced low-boiling point compound was adsorbed continuously on molecular sieve and thereby removed out of the system. Once the amount of the liquid in the autoclave {reaction vessel (1)} became 2000 ml, the supply of PO was stopped and the vapor phase circulation was ended. After maturation at 70° C. for 4 hours, 200 g of water was added and was heated at 130 to 140° C. for 1 hour. After heating for 1 hour, water was distilled off under normal pressure over 2 hours, and then the remaining water was distilled off under reduced pressure over 3 hours while maintaining the pressure at 30 to 50 torr under the introduction of steam, whereby a liquid glycerol-PO adduct (a-3) was obtained.

The glycerol-PO adduct used as a raw material was the same as that used in Production Example 1.

Production Example 4

Production of Polyol a-4

Figure 4:
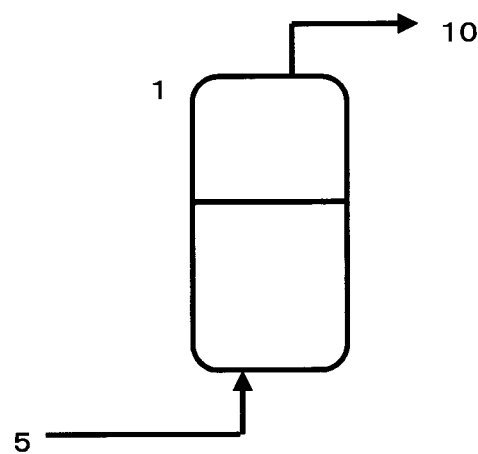
FIG. 4 is a diagram illustrating the reaction apparatus of Production Example 4.

As in the embodiment depicted in FIG. 4, a reduced-pressure line (10) was connected to a 2500-ml stainless steel autoclave, as a reaction vessel (1), equipped with a stirring apparatus, a temperature controlling apparatus, and a feed supply line (5). To the autoclave {reaction vessel (1)} were charged 400 g of a glycerol-PO adduct (hydroxyl value 280) and 0.09 g of tris(pentafluorophenyl)borane, and then PO was supplied through the feed supply line (5) so that the reaction temperature might be maintained at 50 to 60° C. As to the supply of PO, a step was repeated 20 times in which PO is supplied over 10 minutes, then the pressure is reduced (0.01 MPa) through the reduced-pressure line (10), and low-boiling point volatile components are distilled off for 15 minutes. The supply of PO was stopped at the time when the amount of the liquid in the autoclave {reaction vessel (1)} became 2000 ml. After maturation at 70° C. for 4 hours, 200 g of water was added and was heated at 130 to 140° C. for 1 hour. After heating for 1 hour, water was distilled off under normal pressure over 2 hours, and then the remaining water was distilled off under reduced pressure over 3 hours while maintaining the pressure at 30 to 50 torr under the introduction of steam, whereby a liquid glycerol-PO adduct (a-4) was obtained.

The glycerol-PO adduct used as a raw material was the same as that used in Production Example 1.

Production Example 5

Production of Polyol a-5

A liquid glycerol-PO adduct (a-5) was obtained by performing synthesis by the same method as in Production Example 1 except that 666 g of a glycerol-PO adduct (hydroxyl value 168) was used instead of 400 g of a glycerol-PO adduct (hydroxyl value 280).

The glycerol-PO adduct (hydroxyl value 168) used as a raw material was a product synthesized by a known method, that is, a product obtained by adding a prescribed amount of propylene oxide to glycerol using potassium hydroxide as a catalyst, then adding water and synthesized silicate (Kyoward 600, produced by Kyowa Chemical Industry Co., Ltd.), and performing heat treatment for removing the catalyst, filtration, and subsequent dehydration under reduced pressure.

Production Example 6

Production of Polyol a-6

As in the embodiment depicted in FIG. 2, a 2500-ml capacity stainless steel autoclave, as a reaction vessel (1), equipped with a stirring apparatus, a temperature controlling apparatus, and a feed supply line (5), a reaction column (2) (two stainless steel cylindrical tubes, 5.5 cm in inner diameter and 30 cm in length, were used) filled with 400 parts of magnesium oxide (granule, 2 to 0.1 mm in diameter), and a distillation column (3) (30 theoretical plates, a stainless steel cylindrical tube, 5.5 cm in inner diameter, 2 m in length) were connected by circulation lines (6), (7), and (8).

Into the reaction vessel (1) were charged 400 g of a glycerol-PO adduct (hydroxyl value 280) and 0.09 g of tris(pentafluorophenyl)borane, and then the pressure in the autoclave {reaction vessel (1)}, the reaction column (2) and the circulation lines (6), (7), and (8) was reduced to 0.005 MPa. While supplying PO continuously through the feed supply line (5) so that the reaction temperature might be maintained at 50 to 60° C., the vapor phase in the autoclave {reaction vessel (1)} was circulated by using a diaphragm pump at a flow rate of 5 L/min in a sequence of reaction vessel (1)→circulation line (6)→reaction column (2)→circulation line (7)→distillation column (3)→circulation line (8)→reaction vessel (1). While controlling the reaction column (2) to be at 75° C. and 0.08 to 0.15 MPa, by-produced low-boiling point compounds were continuously brought into contact with magnesium oxide, thereby being converted into high-boiling point compounds, which were then separated from PO in the distillation column (3) and thereby removed out of the system. The separated high-boiling point compounds were extracted through a bottom line (4) of the distillation column (3). Once the amount of the liquid in the autoclave {reaction vessel (1)} became 1920 ml, the supply of PO was stopped and the vapor phase circulation was ended. After maturation at 70° C. for 4 hours, 170 g of water was added and was heated at 130 to 140° C. for 1 hour. Water was distilled off under normal pressure over 2 hours, followed by addition of 2 g or potassium hydroxide, and then the remaining water was distilled off under reduced pressure while maintaining the pressure at 30 to 50 torr under the introduction of steam. Subsequently, 80 g of EO was charged over 2 hours through the feed supply line (5) under controlling so as to maintain the reaction temperature at 130 to 140° C., and then maturation was performed for 2 hours. After cooling to 90° C., 12 g of Kyoward 600 (produced by Kyowa Chemical Industry Co., Ltd.; synthetic silicate) and 40 g of water were added, and then treatment was performed for 1 hour. The contents were taken out of the autoclave {reaction vessel (1)} and then filtered through 1-µm filter paper, followed by dehydration under reduced pressure, whereby a liquid glycerol-POEO adduct (a-6) was obtained.

The glycerol-PO adduct used as a raw material was the same as that used in Production Example 1.

Production Example 7

Production of Polyol a-7

A liquid glycerol-POEO adduct (a-7) was obtained by performing synthesis by the same method as in Production Example 6 except that 666 g of a glycerol-PO adduct (hydroxyl value 168) was used instead of 400 g of a glycerol-PO adduct (hydroxyl value 280).

The glycerol-PO adduct used as a raw material was the same as that used in Production Example 5.

Production Example 8

Production of Polyol a-8

A liquid glycerol-PO adduct (a-8) was obtained by performing synthesis by the same method as in Production Example 1 except that 240 g of a glycerol-PO adduct (hydroxyl value 280) was used instead of 400 g of a glycerol-PO adduct (hydroxyl value 280).

Production Example 9

Production of Polyol a-9

A liquid glycerol-PO adduct (a-9) was obtained by performing synthesis by the same method as in Production Example 2 except that 400 g of a glycerol-PO adduct (hydroxyl value 168) was used instead of 400 g of a glycerol-PO adduct (hydroxyl value 280).

The glycerol-PO adduct used as a raw material was the same as that used in Production Example 5.

Production Example 10

Production of Polyol a-10

A liquid propylene glycol-PO adduct (a-10) was obtained by performing synthesis by the same method as in Production Example 2 except that 400 g of a propylene glycol-PO adduct (hydroxyl value 280) was used instead of 400 g of a glycerol-PO adduct (hydroxyl value 280).

The propylene glycol-PO adduct (hydroxyl value 280) was a product synthesized by a known method, that is, a product obtained by adding a prescribed amount of propylene oxide to propylene glycol using potassium hydroxide as a catalyst, then adding water and synthesized silicate (Kyoward 600, produced by Kyowa Chemical Industry Co., Ltd.), and performing heat treatment for removing the catalyst, filtration, and subsequent dehydration under reduced pressure.

Production Example 11

Production of Polyol a-11

A liquid propylene glycol-PO adduct (a-11) was obtained by performing synthesis by the same method as in Production Example 2 except that 666 g of a propylene glycol-PO adduct (hydroxyl value 168) was used instead of 400 g of a glycerol-PO adduct (hydroxyl value 280).

The propylene glycol-PO adduct (hydroxyl value 168) was a product synthesized by a known method, that is, a product obtained by adding a prescribed amount of propylene oxide to propylene glycol using potassium hydroxide as a catalyst, then adding water and synthesized silicate (Kyoward 600, produced by Kyowa Chemical Industry Co., Ltd.), and performing heat treatment for removing the catalyst, filtration, and subsequent dehydration under reduced pressure.

Production Example 12

Production of Polyol a-12

A liquid propylene glycol-POEO adduct (a-12) was obtained by performing synthesis by the same method as in Production Example 6 except that 400 g of a propylene glycol-PO adduct (hydroxyl value 280) was used instead of 400 g of a glycerol-PO adduct (hydroxyl value 280), changing "once the amount of the liquid in the autoclave {reaction vessel (1)} became 1920 ml, the supply of PO was stopped" to "once the amount of the liquid in the autoclave {reaction vessel (1)} became 1400 ml, the supply of PO was stopped", and changing "80 g of EO" to "600 g of EO."

As to the propylene glycol-PO adduct (hydroxyl value 280), one the same as that of Production Example 10 was used.

Production Example 13

Production of Polyol a-13

A liquid pentaerythritol-POEO adduct (a-13) was obtained by performing synthesis by the same method as in Production Example 6 except that 267 g of a pentaerythritol-PO adduct (hydroxyl value 280) was used instead of 400 g of a glycerol-PO adduct (hydroxyl value 280), changing "once the amount of the liquid in the autoclave {reaction vessel (1)} became 1920 ml, the supply of PO was stopped" to "once the amount of the liquid in the autoclave {reaction vessel (1)} became 1840 ml, the supply of PO was stopped", and changing "80 g of EO" to "160 g of EO."

The pentaerythritol-PO adduct (hydroxyl value 280) was a product synthesized by a known method, that is, a product obtained by adding a prescribed amount of propylene oxide to propylene glycol using potassium hydroxide as a catalyst, then adding water and synthesized silicate (Kyoward 600, produced by Kyowa Chemical Industry Co., Ltd.), and performing heat treatment for removing the catalyst, filtration, and subsequent dehydration under reduced pressure.

Production Example 14

Production of Polyol a-14

A liquid pentaerythritol-POEO adduct (a-14) was obtained by performing synthesis by the same method as in Production Example 13 except that 466 g of a pentaerythritol-PO adduct (hydroxyl value 160) was used instead of 267 g of a pentaerythritol-PO adduct (hydroxyl value 280).

The pentaerythritol-PO adduct (hydroxyl value 160) was a product synthesized by a known method, that is, a product obtained by adding a prescribed amount of propylene oxide to propylene glycol using potassium hydroxide as a catalyst, then adding water and synthesized silicate (Kyoward 600, produced by Kyowa Chemical Industry Co., Ltd.), and performing heat treatment for removing the catalyst, filtration, and subsequent dehydration under reduced pressure.

Production Example 15

Production of Polyol a-15

A liquid pentaerythritol-POEO adduct (a-15) was obtained by performing synthesis by the same method as in Production Example 13 except that 200 g of a pentaerythritol-PO adduct (hydroxyl value 280) was used instead of 400 g of a pentaerythritol-PO adduct (hydroxyl value 280).

Production Example 16

Production of Polyol a-16

A liquid pentaerythritol-POEO adduct (a-16) was obtained by performing synthesis by the same method as in Production Example 15 except that 350 g of a pentaerythritol-PO adduct (hydroxyl value 160) was used instead of 200 g of a pentaerythritol-PO adduct (hydroxyl value 280).

As to the pentaerythritol-PO adduct (hydroxyl value 160), one the same as that of Production Example 14 was used.

Production Example 17

Production of Polyol n-1

Figure 5:
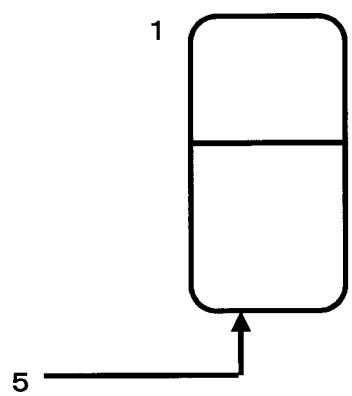
FIG. 5 is a diagram illustrating the reaction apparatus of Production Example 17.

As in the embodiment depicted in FIG. 5, 61 g of glycerol and 4.0 g of potassium hydroxide were charged into a 2500-ml stainless steel autoclave, as a reaction vessel (1), equipped with a stirring apparatus, a temperature controlling apparatus, and a feed supply line (5), and then PO was charged through the feed supply line (5) while controlling the reaction temperature to keep 90 to 100° C. The charge of PO was performed continuously over 6 hours. After the charge was carried out until the amount of the liquid in the autoclave {reaction vessel (1)} became 2000 ml, maturation was performed at 100° C. for 3 hours. Subsequently, 30 g of synthetic silicate (Kyoward 600, product Kyowa Chemical Industry Co., Ltd.) and 40 g of water were added and treated at 90° C. for 1 hour. The contents were taken out of the autoclave {reaction vessel (1)} and then filtered through a 1-μm filter, followed by 2-hour dehydration, whereby a liquid glycerol-PO adduct (n-1) was obtained.

Production Example 18

Production of Polyol n-2

A glycerol-PO adduct (n-2) was obtained by the same method as in Production Example 18 except that 72 g of propylene glycol was used instead of 61 g of glycerol.

The analysis results of the polyoxyalkylene polyol of Production Examples 1 to 16 are shown in Table 1.

The examination result about the formula 1 (the following mathematical expression (4)) disclosed in Patent Document 4 (JP Patent No. 3688667) which conventional polyoxyalkylene polyols satisfy is also provided.

$$y \leq (1.9 \times 10^{-8})w^2 \quad (4)$$

Mathematical expression (4) is a formula that represents the relation between a hydroxyl equivalent w and a degree of unsaturation y, and the modification thereof to a form corresponding to mathematical expressions (1) and (3) in the present invention, i.e., a relational expression of the hydroxyl value x and the degree of unsaturation y of (S), results in mathematical expression (4').

$$y \leq 60 \times x^{-2} \quad (4')$$

TABLE 1

| | | Property of polyol | | | | | | | Whether expression is satisfied or not | | |
|---|---|---|---|---|---|---|---|---|---|---|---|
| | Polyol | Starting material | Hydroxyl value x | Hydroxyl equivalent | Primary hydroxyl group ratio (1) | Primary hydroxyl group ratio (2) | Degree of unsaturation y | EO content z | Right-hand side of mathematical expression 1 | Right-hand side of mathematical expression 3 | Right-hand side of mathematical expression 4 |
| Production Example | 1 a-1 | Glycerol | 56.1 | 1000 | 69 | 69 | 0.005 | 0 | ○ 0.009 | ○ 0.006 | ○ 0.019 |
| | 2 a-2 | | 55.9 | 1004 | 71 | 71 | 0.004 | 0 | ○ 0.009 | ○ 0.006 | ○ 0.019 |
| | 3 a-3 | | 56.0 | 1002 | 70 | 70 | 0.005 | 0 | ○ 0.009 | ○ 0.006 | ○ 0.019 |
| | 4 a-4 | | 56.0 | 1002 | 70 | 70 | 0.005 | 0 | ○ 0.009 | ○ 0.006 | ○ 0.019 |
| | 5 a-5 | | 56.1 | 1000 | 70 | 70 | 0.008 | 0 | ○ 0.009 | X 0.006 | ○ 0.019 |
| | 6 a-6 | | 56.1 | 1000 | 70 | 75 | 0.004 | 4 | ○ 0.009 | ○ 0.006 | |
| | 7 a-7 | | 56.0 | 1002 | 71 | 75 | 0.008 | 4 | ○ 0.009 | X 0.006 | |
| | 8 a-8 | | 33.5 | 1675 | 70 | 70 | 0.014 | 0 | ○ 0.025 | ○ 0.017 | ○ 0.053 |
| | 9 a-9 | | 33.4 | 1680 | 71 | 71 | 0.021 | 0 | ○ 0.025 | X 0.017 | ○ 0.054 |
| | 10 a-10 | Propylene glycol | 55.8 | 1005 | 72 | 72 | 0.004 | 0 | ○ 0.009 | ○ 0.006 | ○ 0.019 |
| | 11 a-11 | | 56.0 | 1002 | 70 | 70 | 0.008 | 0 | ○ 0.009 | X 0.006 | ○ 0.019 |
| | 12 a-12 | | 56.0 | 1002 | 70 | 93 | 0.003 | 30 | ○ 0.006 | ○ 0.004 | |
| | 14 a-13 | Penta-erythritol | 37.5 | 1496 | 71 | 83 | 0.010 | 8 | ○ 0.019 | ○ 0.012 | |
| | 15 a-14 | | 37.3 | 1504 | 70 | 82 | 0.018 | 8 | ○ 0.019 | X 0.012 | |
| | 16 a-15 | | 28.0 | 2004 | 71 | 89 | 0.012 | 8 | ○ 0.033 | ○ 0.022 | |
| | 17 a-16 | | 28.2 | 1989 | 71 | 87 | 0.025 | 8 | ○ 0.033 | X 0.022 | |

The primary hydroxyl group ratio (1) in Table 1 is the primary hydroxyl group ratio in the structure (before EO addition) represented by general formula (VI) and the primary hydroxyl group ratio (2) is the primary hydroxyl group ratio of a polyol.

The analysis results of the polyoxyalkylene polyol of Production Examples 17 to 18 are shown in Table 2. The examination results about the above mathematical expression (4) are also provided.

TABLE 2

| | Polyol | Starting material | Hydroxyl value x | Hydroxyl equivalent | Primary hydroxyl group ratio (2) | Degree of unsaturation y | EO content z | Right-hand side of mathematical expression 1 | | Right-hand side of mathematical expression 3 | | Right-hand side of mathematical expression 4 | |
|---|---|---|---|---|---|---|---|---|---|---|---|---|---|
| Production Example | 17 n-1 | Glycerol | 56.0 | 1002 | 2 | 0.051 | 0 | X | 0.009 | X | 0.006 | X | 0.019 |
| | 18 n-2 | Propylene glycol | 56.3 | 996 | 2 | 0.048 | 0 | X | 0.009 | X | 0.006 | X | 0.019 |

The primary hydroxyl group ratio (2) in Table 2 is the primary hydroxyl group ratio of a polyol.

The methods for measuring the hydroxyl value and degree of unsaturation of the produced polyoxyalkylene polyols and the units thereof are provided below.

Hydroxyl value: measured in accordance with JIS K1557, expressed in the unit of mgKOH/g Degree of unsaturation: measured in accordance with JIS K1557, expressed in the unit of meq/g The hydroxyl equivalent in Tables 1 and 2 is defined by the following mathematical expression (5) and specifically were determined by measuring a hydroxyl value x and then calculating by 56100/hydroxyl value x.

(Hydroxyl equivalent)=(number average molecular weight)/(average number of hydroxyl groups)  (5)

Production Example 19

Production of Strength-Enhancing Agent b-1

Into a 1000-ml stainless steel autoclave equipped with a stirring apparatus and a temperature controlling apparatus, 1 mol of a glycerol-PO adduct (SANNIX GP-1500 produced by Sanyo Chemical Industries, Ltd.; number average molecular weight 1500, hydroxyl value 112.0), 6 mol of phthalic anhydride, and 0.020 mol of an alkaline catalyst (N-ethylmorpholine) were charged and then caused to react under a nitrogen atmosphere at 0.20 MPa and 120±10° C. for 1 hour, whereby half-esterification was performed. Thereafter, 6 mol of PO was dropped over 5 hours under controlling at 120±10° C. and a pressure of 0.50 MPa or lower, and then maturation was performed at 120±10° C. for 1 hour. After the end of the maturation, the alkaline catalyst was removed under reduced pressure at 0.1 MPa for 1 hour, whereby a strength-enhancing agent (b-1) was obtained. Measured values of (b-1) are as follows. Hydroxyl value (mgKOH/g)=61.5, aromatic ring concentration (mmol/g)=2.2.

Production Example 20

Production of Strength-Enhancing Agent b-2

Into an autoclave of the same type as that of Production Example 19, 1 mol of a glycerol-PO adduct (SANNIX GP-1500 produced by Sanyo Chemical Industries, Ltd.; number average molecular weight 1500, hydroxyl value 112.0), 6 mol of phthalic anhydride, and 0.020 mol of an alkaline catalyst (N-ethylmorpholine) were charged and then caused to react under a nitrogen atmosphere at 0.20 MPa and 120±10° C. for 1 hour, whereby half-esterification was performed. Thereafter, 6 mol of EO was dropped over 5 hours under controlling at 120±10° C. and a pressure of 0.50 MPa or lower, and then maturation was performed at 120±10° C. for 1 hour. After the end of the maturation, the alkaline catalyst was removed under reduced pressure at 0.1 MPa for 1 hour, whereby a strength-enhancing agent (b-2) was obtained. Measured values of (b-2) are as follows. Hydroxyl value (mgKOH/g)=63.5, aromatic ring concentration (mmol/g)=2.3.

Production Example 21

Production of Strength-Enhancing Agent b-3

Into an autoclave of the same type as that of Production Example 19, 1 mol of a glycerol-PO adduct (SANNIX GP-3000 produced by Sanyo Chemical Industries, Ltd.; number average molecular weight 3000, hydroxyl value 56.0), 3 mol of phthalic anhydride, and 0.020 mol of an alkaline catalyst (N-ethylmorpholine) were charged and then caused to react under a nitrogen atmosphere at 0.20 MPa and 120±10° C. for 1 hour, whereby half-esterification was performed. Thereafter, 3 mol of EO was dropped over 5 hours under controlling at 120±10° C. and a pressure of 0.50 MPa or lower, and then maturation was performed at 120±10° C. for 1 hour. After the end of the maturation, the alkaline catalyst was removed under reduced pressure at 0.1 MPa for 1 hour, whereby a strength-enhancing agent (b-3) was obtained. Measured values of (b-3) are as follows. Hydroxyl value (mgKOH/g)=47.1, aromatic ring concentration (mmol/g)=0.8.

Production Example 22

Production of Strength-Enhancing Agent b-4

Into an autoclave of the same type as that of Production Example 19, 1 mol of a glycerol-PO adduct (SANNIX GL-3000NS produced by Sanyo Chemical Industries, Ltd.; number average molecular weight 3000, hydroxyl value 56.0), 3 mol of phthalic anhydride, and 0.020 mol of an alkaline catalyst (N-ethylmorpholine) were charged and then caused to react under a nitrogen atmosphere at 0.20 MPa and 120±10° C. for 1 hour, whereby half-esterification was performed. Thereafter, 3 mol of EO was dropped over 5 hours under controlling at 120±10° C. and a pressure of 0.50 MPa or lower, and then maturation was performed at 120±10° C. for 1 hour. After the end of the maturation, the alkaline catalyst was removed under reduced pressure at 0.1 MPa for 1 hour, whereby a strength-enhancing agent (b-4) was obtained. Measured values of (b-4) are as follows. Hydroxyl value (mgKOH/g)=47.1, aromatic ring concentration (mmol/g)=0.8.

Production Example 23

Production of Strength-Enhancing Agent b-5

Into an autoclave of the same type as that of Production Example 19, 1 mol of a glycerol-PO adduct (a-1), 6 mol of phthalic anhydride, and 0.020 mol of an alkaline catalyst (N-ethylmorpholine) were charged and then caused to react under a nitrogen atmosphere at 0.20 MPa and 120±10° C. for 1 hour, whereby half-esterification was performed. Thereafter, 3 mol of EO was dropped over 5 hours under controlling at 120±10° C. and a pressure of 0.50 MPa or lower, and then maturation was performed at 120±10° C. for 1 hour. After the end of the maturation, the alkaline catalyst was removed under reduced pressure at 0.1 MPa for 1 hour, whereby a strength-enhancing agent (b-5) was obtained. Measured values of (b-5) are as follows. Hydroxyl value (mgKOH/g)=47.1, aromatic ring concentration (mmol/g)=0.8.

Production Example 24

Production of Strength-Enhancing Agent b-6

Into an autoclave of the same type as that of Production Example 19, 1 mol of a glycerol-PO adduct (SANNIX KC-725 produced by Sanyo Chemical Industries, Ltd.; number average molecular weight 5000, hydroxyl value 34.0), 3 mol of phthalic anhydride, and 0.020 mol of an alkaline catalyst (N-ethylmorpholine) were charged and then caused to react under a nitrogen atmosphere at 0.20 MPa and 120±10° C. for 1 hour, whereby half-esterification was performed. Thereafter, 3 mol of EO was dropped over 5 hours under controlling at 120±10° C. and a pressure of 0.50 MPa or lower, and then maturation was performed at 120±10° C. for 1 hour. After the end of the maturation, the alkaline catalyst was removed under reduced pressure at 0.1 MPa for 1 hour, whereby a strength-enhancing agent (b-6) was obtained. Measured values of (b-6) are as follows. Hydroxyl value (mgKOH/g)=30.2, aromatic ring concentration (mmol/g)=0.5.

Production Example 25

Production of Strength-Enhancing Agent b-7

Into an autoclave of the same type as that of Production Example 19, 1 mol of a glycerol-PO adduct (SANNIX FA-921NS produced by Sanyo Chemical Industries, Ltd.; number average molecular weight 6000, hydroxyl value 28.0), 3 mol of phthalic anhydride, and 0.020 mol of an alkaline catalyst (N-ethylmorpholine) were charged and then caused to react under a nitrogen atmosphere at 0.20 MPa and 120±10° C. for 1 hour, whereby half-esterification was performed. Thereafter, 3 mol of EO was dropped over 5 hours under controlling at 120±10° C. and a pressure of 0.50 MPa or lower, and then maturation was performed at 120±10° C. for 1 hour. After the end of the maturation, the alkaline catalyst was removed under reduced pressure at 0.1 MPa for 1 hour, whereby a strength-enhancing agent (b-7) was obtained. Measured values of (b-7) are as follows. Hydroxyl value (mgKOH/g)=25.6, aromatic ring concentration (mmol/g)=0.5.

Production Example 26

Production of Strength-Enhancing Agent b-8

Into an autoclave of the same type as that of Production Example 19, 1 mol of a glycerol-PO adduct (SANNIX FA-921NS produced by Sanyo Chemical Industries, Ltd.; number average molecular weight 6000, hydroxyl value 28.0), 3 mol of phthalic anhydride, and 0.020 mol of an alkaline catalyst (N-ethylmorpholine) were charged and then caused to react under a nitrogen atmosphere at 0.20 MPa and 120±10° C. for 1 hour, whereby half-esterification was performed. Thereafter, 3 mol of EO was dropped over 5 hours under controlling at 120±10° C. and a pressure of 0.50 MPa or lower, and then maturation was performed at 120±10° C. for 1 hour. After the end of the maturation, the alkaline catalyst was removed under reduced pressure at 0.1 MPa for 1 hour, whereby a strength-enhancing agent (b-8) was obtained. Measured values of (b-8) are as follows. Hydroxyl value (mgKOH/g)=21.8, aromatic ring concentration (mmol/g)=1.2.

Production Example 27

Production of Strength-Enhancing Agent b-9

Into an autoclave of the same type as that of Production Example 19, 1 mol of a glycerol-PO adduct (SANNIX GP-1500 produced by Sanyo Chemical Industries, Ltd.; number average molecular weight 1500, hydroxyl value 112.0), 6 mol of phthalic anhydride, and 0.020 mol of an alkaline catalyst (N-ethylmorpholine) were charged and then caused to react under a nitrogen atmosphere at 0.20 MPa and 120±10° C. for 1 hour, whereby half-esterification was performed. Thereafter, 6 mol of EO was dropped over 5 hours under controlling at 120±10° C. and a pressure of 0.50 MPa or lower, and then maturation was performed at 120±10° C. for 1 hour. After cooling to room temperature, 1 mol of trimellitic anhydride was charged, followed by esterification at 0.20 MPa and 120±10° C. for 1 hour. Then 2 mol of EO was dropped over 2 hours under controlling at 120±10° C. and a pressure of 0.5 MPa or lower, and then maturation was performed at 120±10° C. for 1 hour. After the end of the maturation, the alkaline catalyst was removed under reduced pressure at 0.1 MPa for 1 hour, whereby a strength-enhancing agent (b-9) was obtained. Measured values of (b-9) are as follows.
Hydroxyl value (mgKOH/g)=74.4, aromatic ring concentration (mmol/g)=2.3.

Production Example 28

Production of Strength-Enhancing Agent b-10

Into an autoclave of the same type as that of Production Example 19, 1 mol of a glycerol-PO adduct (SANNIX GP-1500 produced by Sanyo Chemical Industries, Ltd.; number average molecular weight 1500, hydroxyl value 112.0), 6 mol of phthalic anhydride, and 0.020 mol of an alkaline catalyst (N-ethylmorpholine) were charged and then caused to react under a nitrogen atmosphere at 0.20 MPa and 120±10° C. for 1 hour, whereby half-esterification was performed. Thereafter, 6 mol of EO was dropped over 5 hours under controlling at 120±10° C. and a pressure of 0.50 MPa or lower, and then maturation was performed at 120±10° C. for 1 hour. After cooling to room temperature, 3 mol of trimellitic anhydride was charged, followed by esterification at 0.20 MPa and 120±10° C. for 1 hour. Then 6 mol of EO was dropped over 2 hours under controlling at 120±10° C. and a pressure of 0.5 MPa or lower, and then maturation was performed at 120±10° C. for 1 hour. After the end of the maturation, the alkaline catalyst was removed under reduced pressure at 0.1 MPa for 1 hour, whereby a strength-enhancing agent (b-10) was obtained. Measured values of (b-10) are as follows.
Hydroxyl value (mgKOH/g)=94.1, aromatic ring concentration (mmol/g)=2.5.

Production Example 29

Production of Strength-Enhancing Agent b-11

Into an autoclave of the same type as that of Production Example 19, 1 mol of a glycerol-PO adduct (a-1), 3 mol of phthalic anhydride, and 0.020 mol of an alkaline catalyst (N-ethylmorpholine) were charged and then caused to react under a nitrogen atmosphere at 0.20 MPa and 120±10° C. for 1 hour, whereby half-esterification was performed. Thereafter, 3 mol of EO was dropped over 5 hours under controlling at 120±10° C. and a pressure of 0.50 MPa or lower, and then maturation was performed at 120±10° C. for 1 hour. After cooling to room temperature, 1 mol of trimellitic anhydride was charged, followed by esterification at 0.20 MPa and 120±10° C. for 1 hour. Then 2 mol of EO was dropped over 2 hours under controlling at 120±10° C. and a pressure of 0.5 MPa or lower, and then maturation was performed at 120±10° C. for 1 hour. After the end of the maturation, the alkaline catalyst was removed under reduced pressure at 0.1 MPa for 1 hour, whereby a strength-enhancing agent (b-11) was obtained. Measured values of (b-11) are as follows. Hydroxyl value (mgKOH/g)=58.2, aromatic ring concentration (mmol/g)=1.0.

Production Example 30

Production of Strength-Enhancing Agent b-12

Into an autoclave of the same type as that of Production Example 19, 1 mol of a glycerol-PO adduct (SANNIX PP-1200 produced by Sanyo Chemical Industries, Ltd.; number average molecular weight 1200, hydroxyl value 93.5), 4 mol of phthalic anhydride, and 0.020 mol of an alkaline catalyst (N-ethylmorpholine) were charged and then caused to react under a nitrogen atmosphere at 0.20 MPa and 120±10° C. for 1 hour, whereby half-esterification was performed. Thereafter, 4 mol of EO was dropped over 5 hours under controlling at 120±10° C. and a pressure of 0.50 MPa or lower, and then maturation was performed at 120±10° C. for 1 hour. After the end of the maturation, the alkaline catalyst was removed under reduced pressure at 0.1 MPa for 1 hour, whereby a strength-enhancing agent (b-12) was obtained. Measured values of (b-12) are as follows. Hydroxyl value (mgKOH/g)=57.0, aromatic ring concentration (mmol/g)=2.0.

Production Example 31

Production of Strength-Enhancing Agent b-13

Into an autoclave of the same type as that of Production Example 19, 1 mol of a glycerol-PO adduct (SANNIX PP-2000 produced by Sanyo Chemical Industries, Ltd.; number average molecular weight 2000, hydroxyl value 56.0), 2 mol of phthalic anhydride, and 0.020 mol of an alkaline catalyst (N-ethylmorpholine) were charged and then caused to react under a nitrogen atmosphere at 0.20 MPa and 120±10° C. for 1 hour, whereby half-esterification was performed. Thereafter, 2 mol of EO was dropped over 5 hours under controlling at 120±10° C. and a pressure of 0.50 MPa or lower, and then maturation was performed at 120±10° C. for 1 hour. After the end of the maturation, the alkaline catalyst was removed under reduced pressure at 0.1 MPa for 1 hour, whereby a strength-enhancing agent (b-13) was obtained. Measured values of (b-13) are as follows. Hydroxyl value (mgKOH/g)=47.1, aromatic ring concentration (mmol/g)=0.8.

Production Example 32

Production of Strength-Enhancing Agent b-14

Into an autoclave of the same type as that of Production Example 19, 1 mol of a glycerol-PO adduct (SANNIX PP-1200 produced by Sanyo Chemical Industries, Ltd.; number average molecular weight 1200, hydroxyl value 93.5), 2 mol of phthalic anhydride, and 0.020 mol of an alkaline catalyst (N-ethylmorpholine) were charged and then caused to react under a nitrogen atmosphere at 0.20 MPa and 120±10° C. for 1 hour, whereby half-esterification was performed. After cooling to room temperature, 2 mol of a glycerol-PO adduct (SANNIX PP-2000 produced by Sanyo Chemical Industries, Ltd.; number average molecular weight 2000, hydroxyl value 56.0) and 0.03 mol of tetrabutoxytitanate were charged, and a reaction was carried out under a nitrogen stream at 140±10° C. for 5 hours while water produced was distilled off, whereby a strength-enhancing agent (b-14) was obtained. Measured values of (b-14) are as follows. Hydroxyl value (mgKOH/g)=20.1, aromatic ring concentration (mmol/g)=0.4.

Production Example 33

Production of Strength-Enhancing Agent b-15

Into an autoclave of the same type as that of Production Example 19, 1 mol of ethylene glycol, 2 mol of trimellitic anhydride, 2.2 mol of triethylamine as a catalyst, and 2 mol of THF (tetrahydrofuran) as a solvent were charged and then half-esterification was performed under a nitrogen atmosphere at 80±10° C. for 2 hours. Thereafter, 4 mol of EO as a raw material for constituting R1 was dropped over 1 hour at 80±10° C. and 0.5 MPa, and then maturation was performed for 1 hour. After the end of the maturation, the catalyst was removed under reduced pressure at 0.1 MPa for 1 hour, whereby a strength-enhancing agent (b-15) was obtained. Measured values of (b-15) are as follows. Hydroxyl value (mgKOH/g)=371.5, aromatic ring concentration (mmol/g)=2.7.

Production Example 34

Production of Strength-Enhancing Agent b-16

Into an autoclave of the same type as that of Production Example 19, 1 mol of polyethylene glycol (PEG-200 produced by Sanyo Chemical Industries, Ltd.; number average molecular weight 200, hydroxyl value 560), 1 mol of trimellitic anhydride, 0.02 mol of N-ethylmorpholine as a catalyst, and 2 mol of THF as a solvent were charged and then half-esterification was performed under a nitrogen atmosphere at 80±10° C. for 2 hours. Thereafter, 2 mol of EO as a raw material for constituting R1 was dropped over 2 hours under controlling at 80±10° C. and 0.5 MPa or lower, and then maturation was performed for 3 hours. After the end of the maturation, the catalyst and the solvent were evaporated at 80±10° C., 10 kPa, whereby a strength-enhancing agent (b-16) was obtained. Measured values of (b-16) are as follows. Hydroxyl value (mgKOH/g)=350.6, aromatic ring concentration (mmol/g)=2.1.

Production Example 35

Production of Strength-Enhancing Agent b-17

A strength-enhancing agent b-17 was obtained by the same method as in Production Example 34 except that 2 mol of trimellitic anhydride and 4 mol of EO were used instead of 1 mol of trimellitic anhydride and 2 mol of EO. Measured values of (b-17) are as follows. Hydroxyl value (mgKOH/g) =295.3, aromatic ring concentration (mmol/g)=2.6.

Production Example 36

Production of Strength-Enhancing Agent b-18

A strength-enhancing agent b-18 was obtained by the same method as in Production Example 35 except that pyromellitic anhydride was used instead of trimellitic anhydride, and 6 mol of EO was used instead of 4 mol of EO. Measured values of (b-18) are as follows. Hydroxyl value (mgKOH/g)=374.0, aromatic ring concentration (mmol/g)=2.2.

Production Example 37

Production of Strength-Enhancing Agent b-19

A strength-enhancing agent b-19 was obtained by the same method as in Production Example 35 except that a propylene glycol-POEO adduct (PL-910 produced by Sanyo Chemical Industries, Ltd.; number average molecular weight 900, hydroxyl value 124) was used instead of polyethylene glycol. Measured values of (b-19) are as follows. Hydroxyl value (mgKOH/g)=152.8, aromatic ring concentration (mmol/g) =1.5.

Production Example 38

Production of Strength-Enhancing Agent b-20

Into a reactor equipped with a stirring apparatus, a temperature controlling apparatus, a pressure controlling apparatus, a condenser, a trap, and a liquid circulation pump, 1 mol of polytetramethylene glycol (PTMG-1000 produced by Mitsubishi Chemical Corporation; number average molecular weight 1000, hydroxyl value 112), 1 mol of trimellitic anhydride, 0.02 mol of N-ethylmorpholine as a catalyst, and 5 mol of toluene as a solvent were charged and then half-esterification was performed under a nitrogen atmosphere at 80±10° C. and 0.1 MPa for 2 hours. Thereafter, 2 mol of benzyl chloride as a raw material for constituting R1 was added and then a reaction was performed for 6 hours under controlling at 95±5° C. and 0.06 MPa. During the reaction, an operation of condensing volatilized toluene and water by the condenser and returning toluene separated by the trap to the reactor was performed continuously. After the reaction, the catalyst and the solvent were evaporated at 80±10° C., 10 kPa, whereby a strength-enhancing agent (b-20) was obtained. Measured values of (b-20) are as follows. Hydroxyl value (mgKOH/g)=0, aromatic ring concentration (mmol/g)=3.4.

Production Example 39

Production of Strength-Enhancing Agent b-21

Into a reactor equipped with a stirring apparatus, a temperature controlling apparatus, a pressure controlling apparatus, a condenser, a trap, and a liquid circulation pump, 1 mol of polyethylene glycol (PEG-200 produced by Sanyo Chemical Industries, Ltd.; number average molecular weight 200, hydroxyl value 560), 1 mol of trimellitic anhydride, 0.02 mol of N-ethylmorpholine as a catalyst, and 5 mol of toluene as a solvent were charged and then half-esterification was performed under a nitrogen atmosphere at 80±10° C. and 0.1 MPa for 2 hours. Thereafter, 2 mol of benzylamine as a raw material for constituting R1 was added and then a reaction was performed for 6 hours under controlling at 95±5° C. and 0.06 MPa. During the reaction, an operation of condensing volatilized toluene and water by the condenser and returning toluene separated by the trap to the reactor was performed continuously. After the reaction, the catalyst and the solvent were evaporated at 80±10° C., 10 kPa, whereby a strength-enhancing agent b-21 was obtained. Measured values of (b-21) are as follows. Hydroxyl value (mgKOH/g)=98.4, aromatic ring concentration (mmol/g)=5.3.

Production Example 40

Production of Strength-Enhancing Agent b-22

A strength-enhancing agent b-22 was obtained by the same method as in Production Example 39 except that benzylthiol was used instead of benzylamine. Measured values of (b-22) are as follows. Hydroxyl value (mgKOH/g)=92.9, aromatic ring concentration (mmol/g)=5.0.

Production Example 41

Production of Strength-Enhancing Agent m-1

Into an autoclave of the same type as that of Production Example 19, 1 mol of a glycerol-PO adduct (SANNIX GP-3000 produced by Sanyo Chemical Industries, Ltd.; number average molecular weight 3000, hydroxyl value 56.0), 1 mol of phthalic anhydride, and 0.020 mol of an alkaline catalyst (N-ethylmorpholine) were charged and then caused to react under a nitrogen atmosphere at 0.20 MPa and 120±10° C. for 1 hour, whereby half-esterification was performed. Thereafter, 1 mol of PO was dropped over 5 hours under controlling at 120±10° C. and a pressure of 0.50 MPa or lower, and then maturation was performed at 120±10° C. for 1 hour. After the end of the maturation, the alkaline catalyst was removed under reduced pressure at 0.1 MPa for 1 hour, whereby a strength-enhancing agent (m-1) was obtained. Measured values of (m-1) are as follows. Hydroxyl value (mgKOH/g)=52.7, aromatic ring concentration (mmol/g) =0.3.

Production Example 42

Production of Strength-Enhancing Agent m-2

Into an autoclave of the same type as that of Production Example 19, 1 mol of a glycerol-PO adduct (SANNIX GP-1500 produced by Sanyo Chemical Industries, Ltd.; number average molecular weight 1500, hydroxyl value 112.0), 9 mol of phthalic anhydride, and 0.020 mol of an alkaline catalyst (N-ethylmorpholine) were charged and then caused to react under a nitrogen atmosphere at 0.20 MPa and 120±10° C. for 1 hour, whereby half-esterification was performed. Thereafter, 9 mol of EO was dropped over 5 hours under controlling at 120±10° C. and a pressure of 0.50 MPa or lower, and then maturation was performed at 120±10° C. for 1 hour. After cooling to room temperature, 3 mol of trimellitic anhydride was charged, followed by esterification at 0.20

MPa and 120±10° C. for 1 hour. Then 6 mol of EO was dropped over 2 hours under controlling at 120±10° C. and a pressure of 0.5 MPa or lower, and then maturation was performed at 120±10° C. for 1 hour. After the end of the maturation, the alkaline catalyst was removed under reduced pressure at 0.1 MPa for 1 hour, whereby a strength-enhancing agent (m-2) was obtained. Measured values of (m--2) are as follows. Hydroxyl value (mgKOH/g)=80.3, aromatic ring concentration (mmol/g)=2.9.

Production Example 43

Production of Strength-Enhancing Agent m-3

Into an autoclave of the same type as that of Production Example 19, 1 mol of a glycerol-PO adduct (SANNIX FA-921 produced by Sanyo Chemical Industries, Ltd.; number average molecular weight 6000, hydroxyl value 28.0), 1 mol of phthalic anhydride, and 0.020 mol of an alkaline catalyst (N-ethylmorpholine) were charged and then caused to react under a nitrogen atmosphere at 0.20 MPa and 120±10° C. for 1 hour, whereby half-esterification was performed. Thereafter, 1 mol of EO was dropped over 5 hours under controlling at 120±10° C. and a pressure of 0.50 MPa or lower, and then maturation was performed at 120±10° C. for 1 hour. After the end of the maturation, the alkaline catalyst was removed under reduced pressure at 0.1 MPa for 1 hour, whereby a strength-enhancing agent (m-3) was obtained. Measured values of (m-3) are as follows. Hydroxyl value (mgKOH/g)=27.2, aromatic ring concentration (mmol/g)=0.2.

Production Example 44

Production of Strength-Enhancing Agent m-4

Into an autoclave of the same type as that of Production Example 19, 1 mol of a propylene glycol-PO adduct (NEWPOL PP-4000 produced by Sanyo Chemical Industries, Ltd.; number average molecular weight 4000, hydroxyl value 28.0), 1 mol of maleic anhydride, and 0.020 mol of an alkaline catalyst (N-ethylmorpholine) were charged and then caused to react under a nitrogen atmosphere at 0.20 MPa and 120±10° C. for 1 hour, whereby half-esterification was performed. After cooling to room temperature, 1 mol of a propylene glycol-PO adduct (NEWPOL PP-4000 produced by Sanyo Chemical Industries, Ltd.; number average molecular weight 4000, hydroxyl value 28.0) and 0.03 mol of tetrabutoxytitanate were charged, and a reaction was carried out under a nitrogen stream at 140±10° C. for 5 hours while water produced was distilled off, whereby a strength-enhancing agent (m-4) was obtained. Measured values of (m-4) are as follows. Hydroxyl value (mgKOH/g)=13.7, aromatic ring concentration (mmol/g)=0.

The analysis results of the strength-enhancing agents of Production Examples 19 to 44 are shown in Table 3.

TABLE 3

| | | | Property of polyester polyol | | | | | |
|---|---|---|---|---|---|---|---|---|
| | | | | | Aromatic ring | Number of moles of polycarboxylic acid | | |
| | | Polyol | Hydroxyl value | Hydroxyl equivalent | concentration (mmol/g) | Phthalic anhydride | Trimellitic anhydride | Pyromellitic anhydride | EO content (%) |
| Production Example | 19 | b-1 | 61.5 | 912 | 2.2 | 6 | — | — | 0 |
| | 20 | b-2 | 63.5 | 884 | 2.3 | 6 | — | — | 10 |
| | 21 | b-3 | 47.1 | 1192 | 0.8 | 3 | — | — | 4 |
| | 22 | b-4 | 47.1 | 1192 | 0.8 | 3 | — | — | 20 |
| | 23 | b-5 | 47.1 | 1192 | 0.8 | 3 | — | — | 4 |
| | 24 | b-6 | 30.2 | 1859 | 0.5 | 3 | — | — | 20 |
| | 25 | b-7 | 25.6 | 2192 | 0.5 | 3 | — | — | 17 |
| | 26 | b-8 | 21.8 | 2576 | 1.2 | 9 | — | — | 18 |
| | 27 | b-9 | 74.4 | 754 | 2.3 | 6 | 1 | — | 3 |
| | 28 | b-10 | 62.8 | 894 | 2.5 | 6 | 3 | — | 7 |
| | 29 | b-11 | 57.6 | 975 | 1.0 | 3 | 1 | — | 6 |
| | 30 | b-12 | 57.0 | 984 | 2.0 | 4 | — | — | 9 |
| | 31 | b-13 | 47.1 | 1192 | 0.8 | 2 | — | — | 4 |
| | 32 | b-14 | 20.1 | 2792 | 0.4 | 2 | — | — | 6 |
| | 33 | b-15 | 371.5 | 151 | 2.7 | — | 2 | — | 4 |
| | 34 | b-16 | 350.6 | 160 | 2.1 | — | 1 | — | 2 |
| | 35 | b-17 | 295.3 | 190 | 2.6 | — | 2 | — | 4 |
| | 36 | b-18 | 374.0 | 150 | 2.2 | — | — | 2 | 4 |
| | 37 | b-19 | 152.8 | 367 | 1.5 | — | 2 | — | 4 |
| | 38 | b-20 | 0.0 | — | 3.4 | — | 1 | — | 0 |
| | 39 | b-21 | 98.4 | 570 | 5.3 | — | 1 | — | 0 |
| | 40 | b-22 | 92.9 | 604 | 5.0 | — | 1 | — | 0 |
| | 41 | m-1 | 52.7 | 1064 | 0.3 | 1 | — | — | 4 |
| | 42 | m-2 | 80.3 | 1049 | 2.9 | 9 | 3 | 3 | 2 |
| | 43 | m-3 | 27.2 | 2064 | 0.2 | 1 | — | — | 18 |
| | 44 | m-4 | 13.7 | 4096 | 0.0 | — | — | — | 2 |

In Table 3, the aromatic ring concentration (mmol/g) in a strength-enhancing agent is defined by the following expression (6).

(Aromatic ring concentration in strength-enhancing agent)=(aromatic ring weight in strength-enhancing agent)/(aromatic ring molecular weight)/(strength-enhancing agent weight)  (6)

Example 1

Into a 2500-ml four-neck flask equipped with a stirring apparatus and a temperature controlling apparatus, 162 g of 4,4'-diphenylmethane diisocyanate (trade name: MILLIONATE MT, produced by Nippon Polyurethane Industry Co., Ltd.), 309 g of the polyoxyalkylene polyol (a-10) (molecular weight 2000) obtained in Production Example 10, 103 g of the strength-enhancing agent (b-12) obtained in Production Example 30, 26 g of ethylene glycol, and 1390 g of dimethylformamide were charged, and a reaction was performed at 70° C. until the reaction ratio (consumption ratio) of the isocyanate became 100%. The resulting polyurethane resin solution was spread on a glass plate and then heated at −0.1 MPa, 60° C. for 6 hours, whereby a urethane resin was obtained. The reaction ratio of the isocyanate groups during the reaction was 90% at 2 hours later, 98% at 6 hours later, and 100% at 8 hours later.

Example 2

A urethane resin was synthesized by the same method as in Example 1 except that 206 g of the polyoxyalkylene polyol (a-10) was used instead of 309 g of the polyoxyalkylene polyol (a-10) of Example 1 and 206 g of the strength-enhancing agent (b-12) was used instead of 103 g of the strength-enhancing agent (b-12). The reaction ratio of the isocyanate groups during the reaction was 89% at 2 hours later, 97% at 6 hours later, and 100% at 8 hours later.

Example 3

A urethane resin was synthesized by the same method as in Example 1 except that 103 g of the polyoxyalkylene polyol (a-10) was used instead of 309 g of the polyoxyalkylene polyol (a-10) of Example 1 and 309 g of the strength-enhancing agent (b-12) was used instead of 103 g of the strength-enhancing agent (b-12). The reaction ratio of the isocyanate groups during the reaction was 90% at 2 hours later, 97% at 6 hours later, and 100% at 8 hours later.

Example 4

A urethane resin was synthesized by the same method as in Example 2 except that the polyoxyalkylene polyol (a-11) was used instead of the polyoxyalkylene polyol (a-10) of Example 2 and the strength-enhancing agent (b-13) was used instead of the strength-enhancing agent (b-12). The reaction ratio of the isocyanate groups during the reaction was 89% at 2 hours later, 97% at 6 hours later, and 100% at 8 hours later.

Example 5

A urethane resin was synthesized by the same method as in Example 2 except that the polyoxyalkylene polyol (a-12) was used instead of the polyoxyalkylene polyol (a-10) of Example 2 and the strength-enhancing agent (b-14) was used instead of the strength-enhancing agent (b-12). The reaction ratio of the isocyanate groups during the reaction was 89% at 2 hours later, 98% at 6 hours later, and 100% at 8 hours later.

Example 6

A urethane resin was synthesized by the same method as in Example 2 except that 10.3 g of the strength-enhancing agent (b-15) was used instead of 206 g of the strength-enhancing agent (b-12) of Example 2. The reaction ratio of the isocyanate groups during the reaction was 92% at 2 hours later, 99% at 6 hours later, and 100% at 8 hours later.

Example 7

A urethane resin was synthesized by the same method as in Example 6 except that the strength-enhancing agent (b-16) was used instead of the strength-enhancing agent (b-15) of Example 6. The reaction ratio of the isocyanate groups during the reaction was 91% at 2 hours later, 99% at 6 hours later, and 100% at 8 hours later.

Example 8

A urethane resin was synthesized by the same method as in Example 6 except that the strength-enhancing agent (b-18) was used instead of the strength-enhancing agent (b-15) of Example 6. The reaction ratio of the isocyanate groups during the reaction was 92% at 2 hours later, 99% at 6 hours later, and 100% at 8 hours later.

Example 9

A urethane resin was synthesized by the same method as in Example 6 except that the strength-enhancing agent (b-19) was used instead of the strength-enhancing agent (b-15) of Example 6. The reaction ratio of the isocyanate groups during the reaction was 90% at 2 hours later, 99% at 6 hours later, and 100% at 8 hours later.

Example 10

A urethane resin was synthesized by the same method as in Example 6 except that 5.1 g of the strength-enhancing agent (b-20) was used instead of 10.3 g of the strength-enhancing agent (b-15) of Example 6. The reaction ratio of the isocyanate groups during the reaction was 89% at 2 hours later, 98% at 6 hours later, and 100% at 8 hours later.

Example 11

A urethane resin was synthesized by the same method as in Example 1 except that 391 g of the polyoxyalkylene polyol (a-10) was used instead of 309 g of the polyoxyalkylene polyol (a-10) of Example 1 and 21 g of the strength-enhancing agent (b-12) was used instead of 103 g of the strength-enhancing agent (b-12). The reaction ratio of the isocyanate groups during the reaction was 89% at 2 hours later, 96% at 6 hours later, and 100% at 8 hours later.

Comparative Example 1

A urethane resin was synthesized by the same method as in Example 1 except that 412 g of the polyoxyalkylene polyol (a-10) was used instead of 309 g of the polyoxyalkylene polyol (a-10) of Example 1 and the strength-enhancing agent (b-12) was not used. The reaction ratio of the isocyanate groups during the reaction was 91% at 2 hours later, 99% at 6 hours later, and 100% at 8 hours later.

Comparative Example 2

A urethane resin was synthesized by the same method as in Example 2 except that the polyoxyalkylene polyol (n-2) was used instead of the polyoxyalkylene polyol (a-10) of Example 2 and the strength-enhancing agent (m-4) was used instead of the strength-enhancing agent (b-12). The reaction ratio of the isocyanate groups during the reaction was 86% at 2 hours later, 95% at 6 hours later, and 100% at 8 hours later.

Physical property values of the polyurethane elastomers obtained in Examples 1 to 11 and Comparative Examples 1 to 2 are shown in Table 4.

TABLE 4

|  |  | Example |  |  |  |  |  |  |  |  |  |  | Comparative Example |  |
|---|---|---|---|---|---|---|---|---|---|---|---|---|---|---|
|  |  | 1 | 2 | 3 | 4 | 5 | 6 | 7 | 8 | 9 | 10 | 11 | 1 | 2 |
| Polyol (a) |  | a-10 | a-10 | a-10 | a-11 | a-12 | a-10 | a-10 | a-10 | a-10 | a-10 | a-10 | a-10 | n-2 |
| Polyol (b) |  | b-12 | b-12 | b-12 | b-13 | b-14 | b-15 | b-16 | b-18 | b-19 | b-20 | b-12 |  | m-4 |
| Resin properties | Tensile strength at break | 430 | 460 | 610 | 440 | 290 | 520 | 430 | 540 | 380 | 330 | 330 | 305 | 200 |
|  | Breaking elongation | 990 | 985 | 965 | 980 | 1420 | 920 | 990 | 900 | 1050 | 1380 | 905 | 895 | 1450 |
|  | 100% modulus | 44 | 47 | 55 | 44 | 38 | 50 | 44 | 53 | 42 | 38 | 40 | 39 | 36 |

In Table 4, it was shown that the urethane elastomers of Examples 1 to 4 and 7 to 11 of the present invention have improved mechanical strength (especially, breaking elongation and tensile strength at break) as compared with the urethane elastomer of Comparative Example 1 obtained by a conventional technique. Moreover, it was shown that the urethane elastomer of Example 5 of the present invention has improved mechanical strength (especially, tensile strength at break) as compared with the urethane elastomer of Comparative Example 2 obtained by a conventional technique.

Example 12

A urethane resin was synthesized by the same method as in Example 2 except that the polyoxyalkylene polyol (a-8) was used instead of the polyoxyalkylene polyol (a-10) of Example 2 and the strength-enhancing agent (b-6) was used instead of the strength-enhancing agent (b-12). The reaction ratio of the isocyanate groups during the reaction was 91% at 2 hours later, 99% at 6 hours later, and 100% at 8 hours later.

Example 13

A urethane resin was synthesized by the same method as in Example 2 except that the polyoxyalkylene polyol (a-9) was used instead of the polyoxyalkylene polyol (a-10) of Example 2. The reaction ratio of the isocyanate groups during the reaction was 89% at 2 hours later, 97% at 6 hours later, and 100% at 8 hours later.

Comparative Example 3

A urethane resin was synthesized by the same method as in Comparative Example 1 except that the polyoxyalkylene polyol (a-8) was used instead of the polyoxyalkylene polyol (a-10) of Comparative Example 1. The reaction ratio of the isocyanate groups during the reaction was 87% at 2 hours later, 96% at 6 hours later, and 100% at 8 hours later.

Physical property values of the polyurethane elastomers obtained in Examples 12 and 13 and Comparative Example 3 are shown in Table 5.

TABLE 5

|  |  | Example |  | Comparative Example |
|---|---|---|---|---|
|  |  | 12 | 13 | 3 |
| Polyol (a) |  | a-8 | a-9 | a-8 |
| Polyol (b) |  | b-6 | b-6 |  |

TABLE 5-continued

|  |  | Example |  | Comparative Example |
|---|---|---|---|---|
|  |  | 12 | 13 | 3 |
| Resin properties | Tensile strength at break | 850 | 820 | 540 |
|  | Breaking elongation | 350 | 345 | 340 |
|  | 100% modulus | 75 | 70 | 53 |

In Table 5, it was shown that the urethane elastomers of Examples 12 and 13 of the present invention have improved mechanical strength (especially, breaking elongation and tensile strength at break) as compared with the urethane elastomer of Comparative Example 3 obtained by a conventional technique.

The measuring methods and units of polyurethane elastomer properties are shown below.

Tensile strength at break: in accordance with JIS K6251, unit is kgf/cm$^2$

Breaking elongation: in accordance with JIS K6251, unit is % 100% modulus: in accordance with JIS K6251, unit is kgf/cm$^2$ Examples 14 to 38, Comparative Examples 4 to 7

According to the foaming formulation shown in Tables 6 and 7, a polyurethane slab foam was expanded under the following foaming conditions, and then physical properties of the polyurethane slab foam after being left at rest for a whole day and night were measured. The measured values of physical properties are also provided in Tables 6 and 7.

(Foaming Conditions)

BOX SIZE: 30 cm×30 cm×30 cm, lidless box
Material: wood
Mixing method: hand mixing The raw materials of the polyurethane slab foams in Examples and Comparative Examples are as follows.

1. Urethanization Catalyst (c)

Urethanization catalyst (c-1): "Neostan U-28" (stannous octoate) produced by Nitto Kasei Co., Ltd.

Urethanization catalyst (c-2): "TOYOCAT ET" produced by TOSOH Corporation (a 70 wt % solution of bis(dimethylaminoethyl)ether) in dipropylene glycol)

2. Foaming Agent (d)
Foaming agent (d-1): water

3. Foam Stabilizer (e)
Foam stabilizer (e-1): "L-540" produced by Dow Corning Toray Co., Ltd.

4. Isocyanate
TDI: "Coronate T-80" (tolylene diisocyanate) produced by Nippon Polyurethane Industry Co., Ltd.

TABLE 6

| | | | Example | | | | | | | |
|---|---|---|---|---|---|---|---|---|---|---|
| | | | 14 | 15 | 16 | 17 | 18 | 19 | 20 | 21 |
| <Formulation> (part by weight) | Polyol | a-1 | 75 | 50 | 25 | 75 | 50 | 25 | 75 | 50 |
| | | a-2 | | | | | | | | |
| | | a-3 | | | | | | | | |
| | | a-4 | | | | | | | | |
| | | a-5 | | | | | | | | |
| | | a-6 | | | | | | | | |
| | | a-7 | | | | | | | | |
| | | b-1 | | | | | | | | |
| | | b-2 | 25 | 50 | 75 | | | | | |
| | | b-3 | | | | | | | | |
| | | b-4 | | | | | | | | 25 | |
| | | b-5 | | | | | | | | 50 |
| | | b-9 | | | | 25 | | | | |
| | | b-10 | | | | | 50 | | | |
| | | b-11 | | | | | | 75 | | |
| | | b-17 | | | | | | | | |
| | | b-19 | | | | | | | | |
| | | b-20 | | | | | | | | |
| | | b-21 | | | | | | | | |
| | | b-22 | | | | | | | | |
| | | n-1 | | | | | | | | |
| | | m-1 | | | | | | | | |
| | | m-2 | | | | | | | | |
| | Catalyst | c-1 | 0.18 | 0.21 | 0.24 | 0.18 | 0.21 | 0.24 | 0.18 | 0.21 |
| | | c-2 | 0.15 | 0.15 | 0.15 | 0.15 | 0.15 | 0.15 | 0.15 | 0.15 |
| | Foaming Agent | d-1 | 4.5 | 4.5 | 4.5 | 4.5 | 4.5 | 4.5 | 4.5 | 4.5 |
| | Foam stabilizer | e-1 | 1.0 | 1.0 | 1.0 | 1.0 | 1.0 | 1.0 | 1.0 | 1.0 |
| | TDI (NCO Index) | | 100 | 100 | 100 | 100 | 100 | 100 | 100 | 100 |
| Foam property | Core density | | 24.5 | 23.6 | 23.4 | 24.6 | 23.5 | 23.5 | 24.4 | 24.3 |
| | Hardness (25% ILD) | | 15.1 | 15.3 | 16.4 | 15.4 | 19.5 | 18.5 | 15.1 | 15.1 |
| | Tensile strength | | 0.95 | 1.07 | 1.20 | 0.09 | 1.10 | 1.11 | 0.90 | 0.90 |
| | Tear strength | | 0.69 | 0.72 | 0.82 | 0.68 | 0.65 | 0.64 | 0.65 | 0.65 |
| | Elongation | | 177 | 183 | 174 | 176 | 173 | 175 | 189 | 189 |
| | Residual compressive strain | | 2.3 | 2.4 | 2.9 | 2.2 | 3.6 | 3.4 | 2.2 | 2.4 |
| | Residual hygrothermal compressive strain | | 5.8 | 6.3 | 6.9 | 6.1 | 7.3 | 7.0 | 5.9 | 6.2 |

| | | | Example | | | | | | |
|---|---|---|---|---|---|---|---|---|---|
| | | | 22 | 23 | 24 | 25 | 26 | 27 | 28 |
| <Formulation> (part by weight) | Polyol | a-1 | 25 | | | | | | |
| | | a-2 | | 50 | | | | | |
| | | a-3 | | | 50 | | | | |
| | | a-4 | | | | 50 | | | |
| | | a-5 | | | | | 50 | | |
| | | a-6 | | | | | | 50 | |
| | | a-7 | | | | | | | 50 |
| | | b-1 | | 50 | | | | 50 | 50 |
| | | b-2 | | | | | | | |
| | | b-3 | 75 | | | | | | |
| | | b-4 | | | | | | | |

TABLE 6-continued

| | | | | | | | | |
|---|---|---|---|---|---|---|---|---|
| | | b-5 | | | 50 | 50 | 50 | | |
| | | b-9 | | | | | | | |
| | | b-10 | | | | | | | |
| | | b-11 | | | | | | | |
| | | b-17 | | | | | | | |
| | | b-19 | | | | | | | |
| | | b-20 | | | | | | | |
| | | b-21 | | | | | | | |
| | | b-22 | | | | | | | |
| | | n-1 | | | | | | | |
| | | m-1 | | | | | | | |
| | | m-2 | | | | | | | |
| | Catalyst | c-1 | 0.24 | 0.21 | 0.21 | 0.21 | 0.21 | 0.21 | 0.21 |
| | | c-2 | 0.15 | 0.15 | 0.15 | 0.15 | 0.15 | 0.15 | 0.15 |
| | Foaming Agent | d-1 | 4.5 | 4.5 | 4.5 | 4.5 | 4.5 | 4.5 | 4.5 |
| | Foam stabilizer | e-1 | 1.0 | 1.0 | 1.0 | 1.0 | 1.0 | 1.0 | 1.0 |
| | TDI (NCO Index) | | 100 | 100 | 100 | 100 | 100 | 100 | 100 |
| Foam property | Core density | | 24.7 | 23.8 | 24.2 | 24.1 | 24.4 | 23.5 | 23.7 |
| | Hardness (25% ILD) | | 16.1 | 15.2 | 15.5 | 15.3 | 15.6 | 15.5 | 15.3 |
| | Tensile strength | | 1.01 | 1.02 | 0.96 | 0.97 | 1.02 | 1.10 | 1.07 |
| | Tear strength | | 0.72 | 0.70 | 0.69 | 0.70 | 0.72 | 0.76 | 0.75 |
| | Elongation | | 180 | 180 | 188 | 192 | 195 | 187 | 185 |
| | Residual compressive strain | | 3.1 | 2.5 | 2.3 | 2.2 | 2.5 | 3.0 | 3.1 |
| | Residual hygrothermal compressive strain | | 6.9 | 6.3 | 6.8 | 6.7 | 6.4 | 6.7 | 6.3 |

TABLE 7

| | | | Example | | | | | | | |
|---|---|---|---|---|---|---|---|---|---|---|
| | | | 29 | 30 | 31 | 32 | 33 | 34 | 35 | 36 |
| <Formulation> (part by weight) | Polyol | a-1 | 98 | 98 | 98 | 98 | 98 | 98 | 95 | 95 |
| | | a-2 | | | | | | | | |
| | | a-3 | | | | | | | | |
| | | a-4 | | | | | | | | |
| | | a-5 | | | | | | | | |
| | | a-6 | | | | | | | | |
| | | a-7 | | | | | | | | |
| | | b-1 | | | | | | | | |
| | | b-2 | | | | | | | | |
| | | b-3 | | | | | | | | |
| | | b-4 | | | | | | | | |
| | | b-5 | | | | | | | | |
| | | b-9 | | | | | | | | |
| | | b-10 | | | | | | | | |
| | | b-11 | | | | | | | | |
| | | b-17 | 2 | | | | | 5 | | |
| | | b-19 | | 2 | | | | | 5 | |
| | | b-20 | | | 2 | | | | | 5 |
| | | b-21 | | | | 2 | | | | |
| | | b-22 | | | | | 2 | | | |
| | | n-1 | | | | | | | | |
| | | m-1 | | | | | | | | |
| | | m-2 | | | | | | | | |
| | Catalyst | c-1 | 0.12 | 0.12 | 0.12 | 0.12 | 0.12 | 0.15 | 0.15 | 0.15 |
| | | c-2 | 0.15 | 0.15 | 0.15 | 0.15 | 0.15 | 0.15 | 0.15 | 0.15 |
| | Foaming Agent | d-1 | 4.5 | 4.5 | 4.5 | 4.5 | 4.5 | 4.5 | 4.5 | 4.5 |
| | Foam stabilizer | e-1 | 1.0 | 1.0 | 1.0 | 1.0 | 1.0 | 1.0 | 1.0 | 1.0 |
| | TDI (NCO Index) | | 100 | 100 | 100 | 100 | 100 | 100 | 100 | 100 |

TABLE 7-continued

| Foam property | | | | | | | | | |
|---|---|---|---|---|---|---|---|---|---|
| | Core density | 24.8 | 24.5 | 24.2 | 24.8 | 23.9 | 24.5 | 23.7 | 24.1 |
| | Hardness (25% ILD) | 15.5 | 15.8 | 15.1 | 15.1 | 15.1 | 15.7 | 16.0 | 15.1 |
| | Tensile strength | 0.98 | 1.03 | 1.01 | 0.98 | 0.98 | 1.05 | 1.10 | 1.03 |
| | Tear strength | 0.68 | 0.71 | 0.66 | 0.65 | 0.65 | 0.70 | 0.73 | 0.68 |
| | Elongation | 175 | 179 | 188 | 185 | 183 | 174 | 177 | 190 |
| | Residual compressive strain | 2.3 | 2.3 | 2.4 | 2.4 | 2.3 | 2.4 | 2.5 | 2.4 |
| | Residual hygrothermal compressive strain | 6.6 | 6.5 | 6.6 | 6.6 | 6.6 | 6.4 | 6.4 | 6.7 |

| | | | Example | | Comparative Example | | | |
|---|---|---|---|---|---|---|---|---|
| | | | 37 | 38 | 4 | 5 | 6 | 7 |
| <Formulation> (part by weight) | Polyol | a-1 | 95 | 95 | 100 | | | |
| | | a-2 | | | | | | |
| | | a-3 | | | | | | |
| | | a-4 | | | | | | |
| | | a-5 | | | | | | |
| | | a-6 | | | | | | |
| | | a-7 | | | | | | |
| | | b-1 | | | | | | |
| | | b-2 | | | | 25 | | |
| | | b-3 | | | | | | |
| | | b-4 | | | | | | |
| | | b-5 | | | | | | |
| | | b-9 | | | | | | |
| | | b-10 | | | | | | |
| | | b-11 | | | | | | |
| | | b-17 | | | | | | |
| | | b-19 | | | | | | |
| | | b-20 | | | | | | |
| | | b-21 | 5 | | | | | |
| | | b-22 | | 5 | | | | |
| | | n-1 | | | | 75 | 50 | 25 |
| | | m-1 | | | | | 50 | |
| | | m-2 | | | | | | 75 |
| | Catalyst | c-1 | 0.15 | 0.15 | 0.18 | 0.24 | 0.21 | 0.24 |
| | | c-2 | 0.15 | 0.15 | 0.15 | 0.15 | 0.15 | 0.15 |
| | Foaming Agent | d-1 | 4.5 | 4.5 | 4.5 | 4.5 | 4.5 | 4.5 |
| | Foam stabilizer | e-1 | 1.0 | 1.0 | 1.0 | 1.0 | 1.0 | 1.0 |
| | TDI (NCO Index) | | 100 | 100 | 100 | 100 | 100 | 100 |
| Foam property | Core density | | 24.2 | 24.6 | 24.9 | 25.3 | 25.2 | 25.2 |
| | Hardness (25% ILD) | | 15.1 | 15.1 | 15.0 | 15.0 | 14.8 | 14.9 |
| | Tensile strength | | 0.99 | 1.00 | 0.85 | 0.80 | 0.78 | 0.80 |
| | Tear strength | | 0.66 | 0.66 | 0.60 | 0.61 | 0.55 | 0.57 |
| | Elongation | | 187 | 187 | 171 | 165 | 160 | 166 |
| | Residual compressive strain | | 2.3 | 2.4 | 2.3 | 2.4 | 2.5 | 2.5 |
| | Residual hygrothermal compressive strain | | 6.6 | 6.7 | 6.4 | 6.6 | 6.7 | 6.9 |

The methods for measuring foam properties and the units are given below.

Core density: measured in accordance with JIS K6400, unit is kg/m$^3$

Hardness (25%-ILD): in accordance with JIS K6400, unit is N/314 cm$^2$

Tensile strength: in accordance with JIS K6400, unit is kgf/cm$^2$

Elongation ratio: in accordance with JIS K6400, unit is %

Tear strength: in accordance with JIS K6400, unit is kgf/cm

Residual compressive strain: in accordance with JIS K6400, unit is %

Residual hygrothermal compressive strain: in accordance with JIS K6400, unit is %

In Tables 6 and 7, the urethane foams of Examples 14 to 38 of the present invention have improved foam properties, especially, foam hardness, tensile strength, tear strength, and elongation, as compared with the urethane foams of Comparative Examples 4 to 7 obtained by a conventional technique.

Examples 39 to 50, Comparative Examples 8 to 10

According to the foaming formulation shown in Table 8, a soft polyurethane foam was expanded within a mold under the following foaming conditions to form a foam, and then the foam was taken out of the mold and physical properties of the soft polyurethane foam after being left at rest for a whole day and night were measured. The measured values of physical properties are also provided in Table 8.
(Foaming Conditions)
Mold SIZE: 40 cm×40 cm×10 cm (height)
Mold temperature: 65° C.
Mold material: aluminum
Mixing method: high-pressure urethane foaming machine (produced by Polymer Engineering Co., Ltd.); polyol premix and an isocyanate are mixed at 15 MPa The materials shown in the Examples and the Comparative Examples of polyurethane slab foams were used as raw materials of the soft polyurethane foams of Examples 39 to 50 and Comparative Examples 8 to 10, and other materials are as follows.
1. Urethanization Catalyst (c)
Urethanization catalyst (c-3): "DABCO-33LV" produced by Air Products Japan, Inc. (a 33 wt % solution of triethylenediamine in dipropylene glycol)

2. Foam Stabilizer (e)
Foam stabilizer (e-2): "TEGOSTAB B8737" produced by EVONIK
3. Isocyanate
"CE-729" produced by Nippon Polyurethane Industry Co., Ltd. (TDI-80 (2,4- and 2,6-TDI, the ratio of 2,4-form is 80%/crude MDI (average number of functional groups: 2.9)=80/20 (weight ratio))
4. Polyol (p)
Polymer polyol (p-1): a polymer polyol (polymer content 30%) prepared by copolymerizing styrene and acrylonitrile (weight ratio: 30/70) in polyoxyethylene polyoxypropylene polyol prepared by the block addition of PO and EO to glycerol and having an average number of functional groups of 3.0, a hydroxyl value of 34, and a total content of EO units of 14%, hydroxyl value 24

Polyol (p-2): a polyoxyethylene polyoxypropylene polyol prepared by the random addition of PO and EO to glycerol and having an average number of functional groups of 3.0, a hydroxyl value of 24, and a total content of EO units of 72%

Polyol (p-3): a polyoxypropylene polyol prepared by the addition of PO to sorbitol and having an average number of functional groups of 6.0 and a hydroxyl value of 490

Polyol (p-4): glycerol, an average number of functional groups of 3.0 and a hydroxyl value of 1829

TABLE 8

| | | | Example | | | | | | | |
|---|---|---|---|---|---|---|---|---|---|---|
| | | | 39 | 40 | 41 | 42 | 43 | 44 | 45 | 46 |
| <Formulation> (part by weight) | Polyol | a-14 | 20 | 20 | | | | | | |
| | | a-15 | | | 20 | 20 | | | | |
| | | a-16 | | | | | 30 | | 48 | 48 |
| | | a-17 | | | | | | 30 | | |
| | | b-6 | | | | | 20 | 20 | | |
| | | b-7 | 30 | | 30 | | | | | |
| | | b-8 | | 30 | | 30 | | | | |
| | | b-17 | | | | | | | 2 | |
| | | b-19 | | | | | | | | 2 |
| | | b-20 | | | | | | | | |
| | | n-2 | | | | | | | | |
| | | m-3 | | | | | | | | |
| | | p-1 | 50 | 50 | 50 | 50 | 50 | 50 | 50 | 50 |
| | | p-2 | 0.5 | 0.5 | 0.5 | 0.5 | 0.5 | 0.5 | 0.5 | 0.5 |
| | | p-3 | 1.0 | 1.0 | 1.0 | 1.0 | 1.0 | 1.0 | 1.0 | 1.0 |
| | | p-4 | 0.5 | 0.5 | 0.5 | 0.5 | 0.5 | 0.5 | 0.5 | 0.5 |
| | Catalyst | c-2 | 0.05 | 0.05 | 0.05 | 0.05 | 0.05 | 0.05 | 0.05 | 0.05 |
| | | c-3 | 0.45 | 0.45 | 0.45 | 0.45 | 0.45 | 0.45 | 0.45 | 0.45 |
| | Foaming Agent | d-1 | 2.5 | 2.5 | 2.5 | 2.5 | 2.5 | 2.5 | 2.5 | 2.5 |
| | Foam stabilizer | e-2 | 1.0 | 1.0 | 1.0 | 1.0 | 1.0 | 1.0 | 1.0 | 1.0 |
| | CE-729 (NCO Index) | | 100 | 100 | 100 | 100 | 100 | 100 | 100 | 100 |
| Foam property | Core density | | 50.3 | 50.7 | 50.1 | 50.8 | 50.4 | 51.5 | 51.5 | 52.5 |
| | Hardness (25% ILD) | | 31.7 | 35.2 | 31.8 | 35.1 | 32.6 | 33.3 | 33.5 | 33.9 |
| | Tensile strength | | 1.87 | 2.15 | 1.89 | 2.11 | 1.85 | 2.01 | 1.94 | 2.01 |
| | Tear strength | | 0.77 | 0.89 | 0.73 | 0.85 | 0.73 | 0.78 | 0.77 | 0.81 |
| | Elongation | | 115 | 105 | 110 | 103 | 110 | 103 | 101 | 105 |
| | Residual compressive strain | | 4.3 | 4.8 | 4.5 | 5.2 | 5.0 | 5.9 | 4.7 | 4.6 |
| | Residual hygrothermal compressive strain | | 14.8 | 15.5 | 15.1 | 15.8 | 15.8 | 17.2 | 15.1 | 14.8 |

TABLE 8-continued

|  |  |  | Example | | | | Comparative Example | | |
|---|---|---|---|---|---|---|---|---|---|
|  |  |  | 47 | 48 | 49 | 50 | 8 | 9 | 10 |
| <Formulation> (part by weight) | Polyol | a-14 |  |  |  |  |  |  |  |
|  |  | a-15 |  |  |  |  |  |  |  |
|  |  | a-16 | 48 | 45 | 45 | 45 | 50 |  |  |
|  |  | a-17 |  |  |  |  |  |  |  |
|  |  | b-6 |  |  |  |  |  | 50 |  |
|  |  | b-7 |  |  |  |  |  |  |  |
|  |  | b-8 |  |  |  |  |  |  |  |
|  |  | b-17 |  | 5 |  |  |  |  |  |
|  |  | b-19 |  |  | 5 |  |  |  |  |
|  |  | b-20 | 2 |  |  | 5 |  |  |  |
|  |  | n-2 |  |  |  |  |  |  | 25 |
|  |  | m-3 |  |  |  |  |  |  | 25 |
|  |  | p-1 | 50 | 50 | 50 | 50 | 50 | 50 | 50 |
|  |  | p-2 | 0.5 | 0.5 | 0.5 | 0.5 | 0.5 | 0.5 | 0.5 |
|  |  | p-3 | 1.0 | 1.0 | 1.0 | 1.0 | 1.0 | 1.0 | 1.0 |
|  |  | p-4 | 0.5 | 0.5 | 0.5 | 0.5 | 0.5 | 0.5 | 0.5 |
|  | Catalyst | c-2 | 0.05 | 0.05 | 0.05 | 0.05 | 0.05 | 0.05 | 0.05 |
|  |  | c-3 | 0.45 | 0.45 | 0.45 | 0.45 | 0.45 | 0.45 | 0.45 |
|  | Foaming Agent | d-1 | 2.5 | 2.5 | 2.5 | 2.5 | 2.5 | 2.5 | 2.5 |
|  | Foam stabilizer | e-2 | 1.0 | 1.0 | 1.0 | 1.0 | 1.0 | 1.0 | 1.0 |
|  | CE-729 (NCO Index) |  | 100 | 100 | 100 | 100 | 100 | 100 | 100 |
| Foam property | Core density |  | 51.2 | 51.8 | 52.4 | 52.1 | 52.2 | 51.0 | 52.4 |
|  | Hardness (25% ILD) |  | 32.1 | 33.8 | 34.2 | 32.2 | 32.4 | 33.3 | 30.7 |
|  | Tensile strength |  | 1.96 | 1.99 | 2.05 | 1.98 | 1.84 | 1.76 | 1.72 |
|  | Tear strength |  | 0.75 | 0.79 | 0.83 | 0.76 | 0.70 | 0.70 | 0.66 |
|  | Elongation |  | 110 | 100 | 108 | 119 | 99 | 80 | 102 |
|  | Residual compressive strain |  | 4.7 | 4.8 | 4.6 | 4.8 | 4.6 | 7.5 | 4.5 |
|  | Residual hygrothermal compressive strain |  | 15.3 | 15.0 | 14.7 | 15.4 | 15.1 | 22.1 | 14.9 |

The methods for measuring foam properties and the units are given below.

Core density: measured in accordance with JIS K6400, unit is kg/m$^3$

Hardness (25%-ILD): in accordance with JIS K6400, unit is N/314 cm$^2$

Tensile strength: in accordance with JIS K6400, unit is kgf/cm$^2$

Elongation ratio: in accordance with JIS K6400, unit is %

Tear strength: in accordance with JIS K6400, unit is kgf/cm

Impact resilience: in accordance with JIS K6400, unit is %

Residual compressive strain: in accordance with JIS K6400, unit is %

Residual hygrothermal compressive strain: in accordance with JIS K6400, unit is %

In Table 8, the urethane foams of Examples 39 to 50 of the present invention have improved foam properties, especially, tensile strength, tear strength, and elongation, as compared with the urethane foams of Comparative Examples 8 to 10 obtained by a conventional technique.

INDUSTRIAL APPLICABILITY

A polyurethane obtained using the polyol of the present invention can be used for various applications such as foams, elastomers, and coating materials. Examples of foams include cushioning materials, sound insulation/absorption materials, steerings, and the like of cars. Examples of elastomers include cast-type potting compounds, and the like. Examples of coating materials include adhesives, paints, and the like.

Polyurethane elastomers and polyurethane foams using the polyol of the present invention are generally superior in resin properties (tensile strength, hardness, breaking elongation) as compared with the case of using polyols obtained by conventional techniques.

Therefore, the polyurethane resin of the present invention can be used widely as an adhesive, a sealing material, a coating material, a heat insulating material, an artificial timber, and the like.

Of the foamed polyurethane resins of the present invention, soft polyurethane foams are superior in hardness, foam strength and elongation properties as compared with conventional products. Therefore, the foamed polyurethane resins of the present invention, especially soft polyurethane foams can be used widely for cushioning materials, impact absorbers, shock absorbing materials, sound insulation/absorption materials, and the like.

DESCRIPTION OF REFERENCE SIGNS

1: Reaction vessel
2: Reaction column
3: Distillation column

4: Bottom line
5: Feed supply line
6: Circulation line
7: Circulation line
8: Circulation line
9: Adsorption column
10: Reduced-pressure line

The invention claimed is:

1. A polyol (PL) for polyurethane preparation comprising the following polyol (a) and the following strength-enhancing agent (b):

polyol (a): a polyoxyalkylene polyol that is an alkylene oxide adduct of an active hydrogen-containing compound (H) which is selected from the group consisting of hydroxyl group-containing compounds and amino group-containing compounds and in which at least 60% of the hydroxyl groups positioned on the terminal are primary hydroxyl group-containing groups, strength-enhancing agent (b): a compound produced through esterification with an alkaline catalyst and represented by the following formula (XIII):

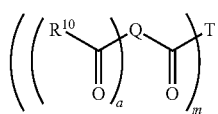
(XIII)

in general formula (XIII), $R^{10}$ represents a residue resulting from the removal of one active hydrogen atom from an active hydrogen-containing compound, wherein the plurality of $R^{10}$'s may be the same or different; Q represents a residue resulting from the removal of a carboxyl group from an aromatic polycarboxylic acid (CA) with a valence of 3 or 4, wherein the aromatic ring of Q is composed of carbon atoms, and the substituents positioned on the aromatic ring may each be either a hydrogen atom or a different substituent, but at least one substituent is a hydrogen atom; a is an integer that satisfies 2≤a≤(the number of the aromatic ring substituents−2); T is different from $R^{10}$ and represents a residue resulting from the removal of m active hydrogen atoms from an active hydrogen-containing compound with a valence of m or higher; and m represents an integer of 1 to 10, wherein the polyol (a) is represented by the following general formula (II):

$R^2-[-(ZO)p-(AO)q-(CH_2CH_2O)r-H]m$ (II)

in general formula (II), $R^2$ is an m-valent group resulting from the removal of m active hydrogen atoms from the active hydrogen-containing compound (H); Z is an alkylene group having 2 to 12 carbon atoms represented by the following general formula (III) or (IV), wherein the alkylene group having 2 to 12 carbon atoms may have been substituted with a halogen atom or an aryl group; A is an alkylene group having 3 to 12 carbon atoms represented by the following general formula (V) or (VI), wherein the alkylene group having 3 to 12 carbon atoms may have been substituted with a halogen atom or an aryl group; when there are a plurality of Z's or A's, these may be the same or different; m is an integer of 2 to 100; p is an integer of 0 to 200 and q is an integer of 1 to 200; r is an integer of 0 to 200:

(III)

(IV)

(V)

(VI)

in general formulae (III) and (IV), $R^3$ represents a hydrogen atom or an alkyl group having 1 to 10 carbon atoms, cycloalkyl group, or phenyl group, wherein the alkyl group having 1 to 10 carbon atoms, cycloalkyl group, or phenyl group may have been substituted with a halogen atom or an aryl group; in general formulae (V) and (VI), $R^4$ represents an alkyl group having 1 to 10 carbon atoms, cycloalkyl group, or phenyl group, wherein the alkyl group having 1 to 10 carbon atoms, cycloalkyl group, or phenyl group may have been substituted with a halogen atom or an aryl group, and wherein said polyol (PL) comprises said polyol (a) in which the portion of moieties (AO)q includes its terminal moiety (AO), at least 60% of the structures A positioned in said terminal moiety (AO) being represented by general formula (VI), and wherein the polyol (a) is contained in a range of 10 to 99.9% by weight based on the weight of polyol (PL), and the strength-enhancing agent (b) is contained in a range of 0.1 to 90% by weight based on the weight of polyol (PL).

2. A method for preparing a polyurethane comprising reacting a polyol component with an isocyanate component, wherein the polyol component contains the polyol (PL) according to claim 1 in an amount of 10 to 100% by weight based on the weight of the polyol component.

* * * * *